United States Patent
Zhu et al.

(10) Patent No.: US 11,416,487 B2
(45) Date of Patent: Aug. 16, 2022

(54) DATA-DRIVEN CHECKPOINT SELECTOR

(71) Applicant: Microsoft Technology Licensing, LLC, Redmond, WA (US)

(72) Inventors: Yiwen Zhu, San Francisco, CA (US); Alekh Jindal, Sammamish, WA (US); Malay Kumar Bag, Kirkland, WA (US); Hiren Shantilal Patel, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 17/029,028

(22) Filed: Sep. 22, 2020

(65) Prior Publication Data
US 2022/0092067 A1 Mar. 24, 2022

(51) Int. Cl.
*G06F 16/2453* (2019.01)
*G06N 20/00* (2019.01)
*G06F 16/2458* (2019.01)

(52) U.S. Cl.
CPC .... *G06F 16/24542* (2019.01); *G06F 16/2477* (2019.01); *G06F 16/24539* (2019.01); *G06N 20/00* (2019.01)

(58) Field of Classification Search
CPC ......... G06F 16/24542; G06F 16/24539; G06F 16/2477; G06F 16/2453; G06N 20/00
USPC .......................................................... 707/718
See application file for complete search history.

(56) References Cited

U.S. PATENT DOCUMENTS

| | | | | |
|---|---|---|---|---|
| 6,006,220 A | * | 12/1999 | Haderle | G06F 16/24542 |
| 6,353,818 B1 | * | 3/2002 | Carino, Jr. | G06F 16/24549 |
| 8,572,051 B1 | * | 10/2013 | Chen | G06F 16/24532 |
| | | | | 707/999.2 |
| 10,565,208 B2 | | 2/2020 | Thou, Jr. et al. | |
| 2007/0226186 A1 | * | 9/2007 | Ewen | G06F 16/24542 |
| 2008/0082526 A1 | * | 4/2008 | Kanawa | G06F 16/972 |
| | | | | 707/999.005 |
| 2008/0140622 A1 | * | 6/2008 | Bestgen | G06F 16/24542 |

(Continued)

OTHER PUBLICATIONS

Zhu, et al., "Phoebe: A Learning-based Checkpoint Optimizer", In Proceedings of the VLDB Endowment, vol. 14, Issue 11, Jul. 2021, pp. 2505-2518.*

(Continued)

*Primary Examiner* — Hicham Skhoun
(74) *Attorney, Agent, or Firm* — Wade IP Law PLLC

(57) ABSTRACT

Techniques are described herein that are capable of selecting checkpoints of a database job. For instance, at compile time, temporal indicators associated with the query plans of the database job are determined. Each temporal indicator indicates first and second subsets of stages of the respective query plan. Values of attributes of each stage in at least each first subset are predicted using a machine learning technique. At the compile time, candidate stage(s) for each query plan are identified based on the respective candidate stage being a child of stage(s) in the corresponding second subset or not being a child of another stage in the respective query plan. The candidate stage(s) for each query plan are selectively chosen as respective checkpoint(s) based on whether the values of the attributes of each stage in at least the first subset of the stages of the respective query plan satisfy one or more criteria.

20 Claims, 13 Drawing Sheets

(56) References Cited

U.S. PATENT DOCUMENTS

| | | | | |
|---|---|---|---|---|
| 2010/0082602 | A1* | 4/2010 | Ganapathi | G06F 16/24545 707/718 |
| 2011/0313999 | A1* | 12/2011 | Bruno | G06F 16/24542 707/718 |
| 2016/0070754 | A1* | 3/2016 | Mokbel | G06F 16/31 707/718 |
| 2017/0286496 | A1* | 10/2017 | Pang | G06F 16/284 |
| 2018/0349364 | A1* | 12/2018 | Arnold | G06F 16/2455 |
| 2019/0102428 | A1* | 4/2019 | Chakkappen | G06F 16/24542 |
| 2019/0392068 | A1* | 12/2019 | Wen | G06F 16/2453 |
| 2020/0311082 | A1* | 10/2020 | Mayr | G06F 16/2246 |
| 2022/0083552 | A1* | 3/2022 | Gupta | G06F 16/24535 |
| 2022/0100763 | A1* | 3/2022 | Sen | G06N 20/00 |

OTHER PUBLICATIONS

Vijayshankar Raman "Progressive Optimization in Action" Proceedings ofthe 30th VLDB Conference,Toronto, Canada, 2004. p. 1337-1340.*

Daniel Playfair "Big data availability: Selective partial checkpointing for in-memory database queries". 2016 IEEE International Conference on Big Data (Big Data). pp. 2785-2794.*

"Amazon Athena", Retrieved From https://web.archive.org/web/20170912003651/https://aws.amazon.com/athena/, Sep. 12, 2017, 8 Pages.

"Azure Machine Learning", Retrieved from: https://azure.microsoft.com/en-us/services/machine-learning/, Retrieved Date: Sep. 1, 2020, 23 Pages.

"H2O.ai", Retrieved from: https://docs.h2o.ai/, Retrieved Date: Sep. 1, 2020, 7 Pages.

Zhou, et al., "Incorporating Partitioning and Parallel Plans into the SCOPE Optimizer", In Proceedings of the IEEE 26th International Conference on Data Engineering, Mar. 1, 2010, 12 Pages.

"One-hot", Retrieved from: https://en.wikipedia.org/wiki/One-hot, Retrieved Date: Sep. 1, 2020, 2 Pages.

"OR-Tools", Retrieved from: https://developers.google.com/optimization/, Retrieved Date: Sep. 1, 2020, 3 Pages.

"Topological Sorting", Retrieved From: https://en.wikipedia.org/wiki/Topological_sorting, Sep. 1, 2020, 7 Pages.

Ahmed, et al., "Machine Learning at Microsoft with ML. NET", In Proceedings of the 25th ACM SIGKDD International Conference on Knowledge Discovery & Data Mining, Aug. 4, 2019, pp. 2448-2458.

Ananthanarayanan, et al., "Reining in the Outliers in Map-Reduce Clusters Using Mantri", In Proceedings of the 9th USENIX conference on Operating systems design and implementation, Oct. 4, 2010, 14 Pages.

Bello, et al., "Neural combinatorial optimization with reinforcement learning", In Repository of arXiv:1611.09940v1, Nov. 29, 2016, pp. 1-13.

Bengio, et al., "A Neural Probabilistic Language Model", In Journal of Machine Learning Research, vol. 3, Feb. 2003, 7 Pages.

Bishop, Christopher M., "Pattern Recognition and Machine Learning", In Publication of Springer, 2006, 758 Pages.

Bojanowski, et al., "Enriching Word Vectors with Subword Information", In Journal of Computing Research Repository, Jul. 2016, 12 Pages.

Boutin, et al., "Apollo: Scalable and coordinated scheduling for cloud-scale computing", In Proceedings of 11th USENIX Conference on Operating Systems Design and Implementation, Oct. 6, 2014, pp. 285-300.

Bruno, et al., "Recurring job optimization in SCOPE", In Proceedings of the ACM SIGMOD International Conference on Management of Data, May 20, 2012, 2 Pages.

Bruno, et al., "Continuous Cloud-Scale Query Optimization and Processing", In Proceedings of the VLDB Endowment, vol. 6 Issue 11, Aug. 27, 2013, pp. 961-972.

Chaiken, et al., "SCOPE: Easy and Efficient Parallel Processing of Massive Data Sets", In Proceedings of the VLDB Endowment, vol. 1, Issue 2, Aug. 1, 2008, pp. 1265-1276.

Chen, et al., "A selective checkpointing mechanism for query plans in a parallel database system.", In Proceedings of IEEE International Conference on Big Data, Oct. 6, 2013, pp. 237-245.

Curing, et al., "Hydra: a federated resource manager for data-center scale analytics", In Proceedings of the 16th USENIX Conference on Networked Systems Design and Implementation, Feb. 26, 2019, 15 Pages.

Diaz, et al., "Azure Data Lake Store and Azure Data Lake Analytics", In Publication of Springer, Jun. 24, 2018.

Dutt, et al., "Selectivity Estimation for Range Predicates Using Lightweight Models", In Proceedings of the VLDB Endowment, vol. 12, Issue 9, May 1, 2019, pp. 1044-1057.

Ferguson, et al., "Jockey: Guaranteed job latency in data parallel clusters", In Proceedings of the 7th ACM european conference on Computer Systems, Apr. 10, 2012, pp. 99-112.

Forrest, et al., "coin-or/Cbc: Version 2.9.9", Retrieved from: https://zenodo.org/record/1317566#.X22p2ygzZPY, Jul. 19, 2018, 4 Pages.

Gers, et al., "Learning to forget: Continual prediction with LSTM", In Technical Report IDSIA-01-99, Jan. 1999, pp. 1-19.

Grandl, et al., "{GRAPHENE}: Packing and dependency-aware scheduling for data-parallel clusters", In 12th {USENIX} Symposium on Operating Systems Design and Implementation, Nov. 2, 2016, pp. 81-97.

Guo, et al., "Spotting code optimizations in data-parallel pipelines through periscope", In 10th {USENIX} Symposium on Operating Systems Design and Implementation, Oct. 8, 2012, pp. 121-133.

Jindal, et al., "Computation Reuse in Analytics Job Service at Microsoft", In Proceedings of the 2018 International Conference on Management of Data, Jun. 10, 2018, pp. 191-203.

Jindal, et al., "Peregrine: Workload Optimization for Cloud Query Engines", In Proceedings of the ACM Symposium an Cloud Computing, Nov. 20, 2019, pp. 416-427.

Jindal, et al., "Selecting Subexpressions to Materialize at Datacenter Scale", In Proceedings of the VLDB Endowment, vol. 11, Issue 7, Mar. 2018, pp. 800-812.

Jyothi, et al., "Morpheus: Towards Automated SLOs for Enterprise Clusters", In Proceedings of 12th USENIX Symposium on Operating Systems Design and Implementation, Nov. 2, 2016, pp. 117-134.

Karanasos, et al., "Mercury: Hybrid Centralized and Distributed Scheduling in Large Shared Clusters", In Proceedings of the USENIX Annual Technical Conference, Jul. 8, 2015, pp. 485-497.

Ke, et al., "LightGBM: A Highly Efficient Gradient Boosting Decision Tree", In Proceedings of the 31st International Conference on Neural Information Processing Systems, Dec. 4, 2017, 9 Pages.

Kipf, et al., "Learned Cardinalities: Estimating Correlated Joins with Deep Learning", In Repository of arXiv:1809.00677v2, Dec. 18, 2018, 8 Pages.

Kleywegt, et al., "The dynamic and stochastic knapsack problem", In Journal of Operations research vol. 46, Issue 1, Jan. 1998, pp. 17-35.

Kleywegt, et al., "The dynamic and stochastic knapsack problem with random sized items", In Journal of Operations Research vol. 49, Issue 1, Jan. 2001, pp. 26-41.

Little, John DC, "A proof for the queuing formula: L= ?? W.", In Journal of Operations research vol. 9, Issue 3, May 1961, pp. 383-387.

Mao, et al., "Learning scheduling algorithms for data processing clusters", In Proceedings of the ACM Special Interest Group on Data Communication, Aug. 19, 2019, pp. 270-288.

Marchetti-Spaccamela, et al., "Stochastic on-line knapsack problems", In Journal of Mathematical Programming, vol. 68, Issue 1-3, Jan. 1995.

Marcus, et al., "Neo: A Learned Query Optimizer", In repository of arXiv: 1904.03711v1, Apr. 7, 2019, 18 Pages.

Marcus, "Plan-structured deep neural network models for query performance prediction", In Repository of arXiv:1902.00132v1, Jan. 31, 2019, 16 Pages.

(56) References Cited

OTHER PUBLICATIONS

Mou, et al., "Convolutional neural networks over tree structures for programming language processing", In Proceedings of the Thirtieth AAAI Conference on Artificial Intelligence, Feb. 12, 2016, 8 Pages.
Ormont, "microsoft/ NimbusML", https://github.com/Microsoft/NimbusML, Retrieved Date: Sep. 1, 2020, 4 Pages.
Ortiz, et al., "Learning State Representations for Query Optimization with Deep Reinforcement Learning", In Proceedings of the Second Workshop on Data Management for End-To-End Machine Learning, Article No. 4, Jun. 15, 2018, 4 Pages.
Pedregosa, et al., "Scikit-learn: Machine Learning in Python", In Journal of Machine Learning Research, vol. 12, Oct. 2011, pp. 2825-2830.
Pennington, et al., "GloVe: Global Vectors for Word Representation", In Proceedings of the 2014 Conference on Empirical Methods in Natural Language Processing (EMNLP), Oct. 2014, pp. 1532-1543.
Popa, et al., "Dryadinc: Reusing Work in Large-scale Computations", In Proceedings of the Conference on Hot Topics in Cloud Computing, Jun. 2009, 5 Pages.
Qiao, et al., "Hyper dimension shuffle: Efficient data repartition at petabyte scale in scope", In Proceedings of the VLDB Endowment, vol. 12, Issue 10, Jun. 1, 2019, pp. 1113-1125.
Ramakrishnan, et al., "Azure Data Lake Store: A Hyperscale Distributed File Service for Big Data Analytics", In Proceedings of the ACM International Conference on Management of Data, May 14, 2017, pp. 51-63.
Sarkar, et al., "Learning AWS: Design, build, and deploy responsive applications using AWS Cloud components", In Publication of Packt Publishing Ltd, Feb. 1, 2018.
Shao, et al., "Griffon: Reasoning about Job Anomalies with Unlabeled Data in Cloud-based Platforms", In Proceedings of the ACM Symposium on Cloud Computing, Nov. 2019, pp. 441-452.
Sarkar, et al., "Learning AWS: Design, build, and deploy responsive applications using AWS Cloud components", 2018, 396 pages, Second Edition, Packt Publishing Ltd., Birmingham, United Kingdom.
Tigani, et al., "Google BigQuery Analytics", 2014, 508 pages, John Wiley & Sons, Inc., Indianapolis, Indiana.
Siddiqui, et al., "Cost models for big data query processing: Learning, retrofitting, and our findings", In Proceedings of the ACM SIGMOD International Conference on Management of Data, Jun. 14, 2020, pp. 99-113.
Singh, et al., "A progressive query materialization for interactive data exploration", In Proceeding of 1st International Workshop Social Data Analytics and Management, 2016, 10 Pages.
Thusoo, et al., "Hive: A Warehousing Solution Over A Map-Reduce Framework", In Proceedings of VLDB Endowment vol. 2 Issue 2,, Aug. 2009, pp. 1626-1629.
Tigani, et al., "Google BigQuery Analytics", In Publications of John Wiley & Sons, May 21, 2014.
Ting, et al., "Stacking bagged and dagged models", In working Paper 97/9, Mar. 1997, pp. 1-20.
Upadhyaya, et al., "A Latency and Fault-Tolerance Optimizer for Online Parallel Query Plans", In Proceedings of the ACM SIGMOD International Conference on Management of Data, Jun. 12, 2011, 12 Pages.
Vojnovic, et al., "Sampling based range partition methods for big data analytics", In Technical Report MSR-TR-2012-18, Mar. 2012, 17 Pages.
Wu, et al., "SCOPE Playback: Self-Validation in the Cloud", In Proceedings of the Fifth International Workshop on Testing Database Systems, May 21, 2012, 6 Pages.
Wu, et al., "Towards a Learning Optimizer for Shared Clouds", In Proceedings of the VLDB Endowment, vol. 12, Issue 3, Nov. 2018, pp. 210-222.
Yang, et al., "Osprey: Implementing MapReduce-Style Fault Tolerance in a Shared-Nothing Distributed Database", In Proceeedings of 29th International Conference on Data Engineering (ICDE)., Mar. 1, 2010, pp. 657-668.
Zaharia, et al., "Spark: Cluster Computing with Working Sets", In Proceedings of 2nd USENIX Workshop on Hot Topics in Cloud Computing, Jun. 22, 2010, pp. 1-7.
Zhang, et al., "Optimizing data shuffling in data-parallel computation by understanding user-defined functions", In Proceedings of the the 9th {USENIX} Symposium on Networked Systems Design and Implementation, 2012, 14 Pages.
Zhou, et al., "Advanced Partitioning Techniques for Massively Distributed Computation", In Proceedings of the ACM SIGMOD International Conference on Management of Data, May 20, 2012, pp. 13-24.
Zhou, et al., "Budget constrained bidding in keyword auctions and online knapsack problems", In International Workshop on Internet and Network Economics, Apr. 21, 2008, pp. 1243-1244.
"International Search Report & Written Opinion issued in PCT Application No. PCT/US21/036070", dated Sep. 23, 2021,11 Pages.
Playfair, et al., "Big Data Availability: Selective Partial Checkpointing for In-Memory Database Queries", In Proceedings of IEEE International Conference on Big Data (Big Data), Dec. 5, 2016, 11 Pages.

\* cited by examiner

DATA-DRIVEN CHECKPOINT SELECTOR

BACKGROUND

Big data platforms have democratized scalable data processing over the last decade, enabling developers to write increasingly complex programs (a.k.a. jobs) without worrying about subsequently scaling those jobs. However, large analytical jobs present a variety of challenges, as compared to smaller jobs. For example, such jobs typically include more tasks that depend on other tasks, which may lead to a relatively high number of tasks being instantiated on the same machine. This may stress the machines with large amounts of intermediate outputs that are generated to assist with recovery from task failures. In another example, large jobs may be prone to higher failure rates, and restarting the large jobs from scratch may be substantially more expensive. In yet another example, query optimizer estimates of large jobs may be substantially worse (e.g., because errors in cardinality propagate exponentially), which may increase a likelihood of choosing less optimal query plans in later parts of the job. In still another example, the larger amount of intermediate data associated with larger jobs may necessitate concurrent scaling of computations and temporary storage.

Checkpointing (i.e., persisting intermediate output(s) to a global persistent store) may alleviate some of the issues associated with large jobs. A variety of techniques have been proposed to utilize checkpointing for this purpose. However, each such technique has its limitations. For instance, a first conventional technique called Osprey utilizes an intra-query checkpoint mechanism for a distributed database system and preserves the intermediate output files for all sub-queries. A second conventional technique called FTOpt utilizes a cost-based fault-tolerance optimizer to determine fault-tolerance strategy and the frequency of checkpoints for each operator in a query plan. A third conventional technique utilizes a divide-and-conquer algorithm to select checkpoints based on an operator model given the size of input/output tuples. However, conventional solver-based techniques often have a substantial latency, and the assumptions for the operator model may not be valid in the analyzed production system with unknown size of inputs/outputs.

SUMMARY

Various approaches are described herein for, among other things, selecting checkpoints of a recurrent database job using a data-driven technique. By using a data-driven technique, selection of the checkpoints in the recurrent database job may be optimized for a designated objective function and/or for designated constraints. For instance, the checkpoints may be selected in this manner to reduce (e.g., minimize) an amount of intermediate data associated with query plans of the recurrent database job stored in local data stores, to reduce an amount of recovery time from a failure of the recurrent database job, to split a large recurrent database job into multiple smaller database jobs, etc.

A checkpoint of a recurrent database job may be defined as a stage of the recurrent database job from which changes indicated by transaction log records of the recurrent database job are capable of being applied to recover committed data to a point in execution of the recurrent database job at which a failure of the recurrent database job occurs. A recurrent database job includes multiple database queries. A result of compiling a database query is referred to as a query plan or an execution plan. Each query plan includes multiple stages. Each stage includes multiple threads. At compile time of the database queries, temporal indicators associated with the query plans are determined. Each temporal indicator indicates a reference time. For instance, each temporal indicator may be thought of as a figurative "cut" through a query plan, such that a first subset of the stages of the query plan temporally precede the reference time indicated by the temporal indicator, and a second subset of the stages of the query plan temporally follow the reference time. In this figurative representation, the stages in the first subset are to have completed execution by the reference time, and the stages in the second subset are not to have completed execution by the reference time. The stages of the query plans have attributes, and each attribute of a query plan has a value. Information (e.g., factors) about each stage is analyzed to determine the values of the attributes of the stage. Stages in the first subsets that are children of stages in the second subsets or that are not children of another stage are considered for selection as checkpoints of the recurrent database job. For each considered stage in a query plan, if the values of the attributes of the stage satisfy one or more criteria (e.g., objectives and/or thresholds), the stage is chosen to be a checkpoint of the recurrent database job. Otherwise, the stage is not chosen to be a checkpoint of the recurrent database job.

In an example approach, at compile time of database queries that define a recurrent database job, temporal indicators associated with query plans that result from compilation of the respective database queries are determined such that one or more temporal indicators are associated with each query plan. Each of the one or more temporal indicators associated with each query plan indicates a first subset of a plurality of stages of the respective query plan that are to have executed by a respective reference time indicated by the respective temporal indicator and a second subset of the plurality of stages of the respective query plan that are not to have executed by the respective reference time. Values of respective attributes of each stage in at least the first subset of the plurality of stages of each query plan indicated by a first temporal indicator associated with the respective query plan are predicted by analyzing historical values of the attributes of the respective stage for each of a plurality of historical executions of the respective stage using a machine learning technique. At the compile time of the database queries, one or more candidate stages for each query plan are identified from the first subset of the plurality of stages of the respective query plan indicated by the first temporal indicator associated with the respective query plan based on (e.g., based at least in part on) each candidate stage being a child of one or more stages in the second subset of the plurality of stages of the respective query plan indicated by the first temporal indicator associated with the respective query plan or not being a child of another stage in the respective query plan. The one or more candidate stages for each query plan that correspond to the first temporal indicator associated with the respective query plan are selectively chosen to be one or more respective checkpoints of the recurrent database job based on whether the values of the respective attributes of each stage in at least the first subset of the plurality of stages of the respective query plan indicated by the first temporal indicator associated with the respective query plan satisfy one or more criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
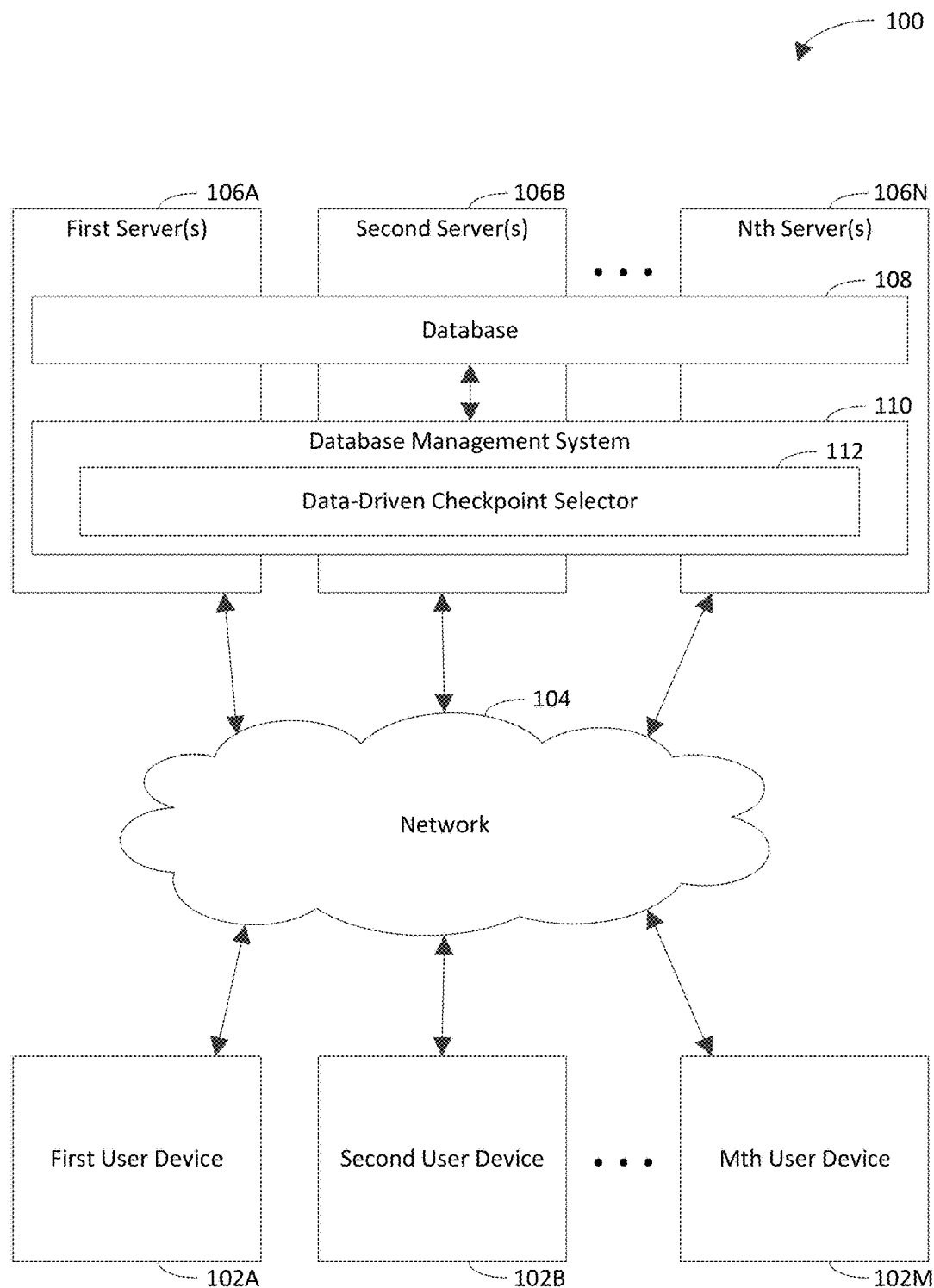
FIG. 1 is a block diagram of an example data-driven checkpoint selection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of selecting checkpoints of a recurrent database job using a data-driven technique. By using a data-driven technique, selection of the checkpoints in the recurrent database job may be optimized for a designated objective function and/or for designated constraints. For instance, the checkpoints may be selected in this manner to reduce (e.g., minimize) an amount of intermediate data associated with query plans of the recurrent database job stored in local data stores, to reduce an amount of recovery time from a failure of the recurrent database job, to split a large recurrent database job into multiple smaller database jobs, etc.

A checkpoint of a recurrent database job may be defined as a stage of the recurrent database job from which changes indicated by transaction log records of the recurrent database job are capable of being applied to recover committed data to a point in execution of the recurrent database job at which a failure of the recurrent database job occurs. A recurrent database job includes multiple database queries. A result of compiling a database query is referred to as a query plan or an execution plan. Each query plan includes multiple stages. Each stage includes multiple threads. At compile time of the database queries, temporal indicators associated with the query plans are determined. Each temporal indicator indicates a reference time. For instance, each temporal indicator may be thought of as a figurative "cut" through a query plan, such that a first subset of the stages of the query plan temporally precede the reference time indicated by the temporal indicator, and a second subset of the stages of the query plan temporally follow the reference time. In this figurative representation, the stages in the first subset are to have completed execution by the reference time, and the stages in the second subset are not to have completed execution by the reference time. The stages of the query plans have attributes, and each attribute of a query plan has a value. Information (e.g., factors) about each stage is analyzed to determine the values of the attributes of the stage. Stages in the first subsets that are children of stages in the second subsets or that are not children of another stage are considered for selection as checkpoints of the recurrent database job. For each considered stage in a query plan, if the values of the attributes of the stage satisfy one or more criteria (e.g., objectives and/or thresholds), the stage is chosen to be a checkpoint of the recurrent database job. Otherwise, the stage is not chosen to be a checkpoint of the recurrent database job.

Example techniques described herein have a variety of benefits as compared to conventional techniques for selecting checkpoints of a recurrent database job. For instance, the example techniques may be capable of reducing an amount of time and/or resources (e.g., processor, memory, network bandwidth) that are consumed to execute a recurrent database job and/or to recover from failure of the recurrent database job. For example, the example techniques may reduce (e.g., minimize) an amount of intermediate data stored locally in store(s) of a database against which the recurrent database job executes. Such intermediate data may be deleted from the local stores as a result of the stages that generate the intermediate data being selected as checkpoints of the recurrent database job. The example techniques may be capable of reducing an amount of intermediate data stored in some local stores by 70% or more. Availability of the intermediate data may be maintained by storing the intermediate data in a global store of the database. In another example, the example techniques may enable recovery from a failure of the recurrent database job at checkpoints that are selected based on (e.g., based at least in part on) an amount of time that is expected to be saved by using those checkpoints for the recovery. For instance, the checkpoints may be selected because those checkpoints provide more time savings than other stages that could have been selected as checkpoints. In yet another example, the checkpoints may be selected based on a cumulative load of the stages associated with each checkpoint. The stages associated with each checkpoint may include the checkpoint and ancestor stages of the checkpoint (e.g., stages that temporally follow the checkpoint in a dependency chain of the checkpoint). For instance, portions of the recurrent database job may be divided into multiple smaller jobs corresponding to the respective checkpoints based on the cumulative loads of the stages associated with the checkpoints being balanced (e.g., substantially same).

By reducing the amount of time and/or resources that are consumed to execute the recurrent database job and/or to recover from failure of the recurrent database job, the example techniques may reduce a cost of utilizing and/or maintaining the recurrent database job. For instance, the intermediate output file of each stage of a query plan has an associated cost for maintaining the intermediate output file in local storage of the database. By enabling deletion of the intermediate output file from the local storage, the example embodiments reduce the cost to maintain intermediate data among the local store(s). By enabling recovery from a failure of the recurrent database job using the checkpoints selected in accordance with the techniques described herein, the example embodiments avoid the cost of re-executing the stages that precede the checkpoints and/or reduce a likelihood of another failure of the recurrent database job occurring. The example techniques may increase efficiency of a computing system that is used to execute the recurrent database job. The example techniques may increase user efficiency (e.g., by reducing an amount of time that is consumed to execute the database queries and/or to recover from a failure of the recurrent database job).

FIG. 1 is a block diagram of an example data-driven checkpoint selection system 100 in accordance with an embodiment. Generally speaking, the data-driven checkpoint selection system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the data-driven checkpoint selection system 100 selects checkpoints of a recurrent database job.

As shown in FIG. 1, the data-driven checkpoint selection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request (a.k.a. access request), requesting access to information that is based on data stored in a database 108 that is hosted by any one or more of the servers 106A-106N. A user may initiate a request for accessing such information using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 106A-106N, so that the user devices 102A-102M may access information that is available via the domains. Such domains may include Web pages, which may be provided as hypertext markup language (HTML) documents and objects (e.g., files) that are linked therein, for example.

The user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, the servers 106A-106N are configured to host respective Web sites, so that the Web sites are accessible to users of the data-driven checkpoint selection system 100.

One or more of the servers 106A-106N host a database 108. The database 108 is an organized collection of information (e.g., data). The database 108 may be any suitable type of database, including but not limited to a relational database, an entity-relationship database, an object database, an object relational database, an extensible markup language (XML) database, etc.

One or more of the servers 106A-106N host a database management system (DBMS) 110. The DBMS 110 executes database jobs (e.g., recurrent database jobs) against the database 108; controls access to the information in the database 108; provides functions that enable entry, storage, and retrieval of the information in the database 108; and provides ways to manage how the information is organized in the database 108. Some of the functions provided by the DBMS 110 for management of the database 108 and the information therein can be grouped as follows: (1) creation, modification, and deletion of definitions that define how the information in the database 108 is organized; (2) insertion, modification, and deletion of the information in the database 108; (3) structuring the data in a form that is directly useable by users of the user devices 102A-102M and/or by application(s); and (4) administration of the database 108. Administration of the database may include, for example, registering and monitoring users of the database 108, enforcing security of the information in the database 108, monitoring performance of the database 108, recovering from a failure of a database job that is executed against the database 108, etc. The DMBS 110 may interact with users of the user devices 102A-102M, the database 108, and/or computer programs (e.g., applications) running on the user devices 102A-102M and/or the servers 106A-106N to perform its functions.

The DBMS 110 includes a data-driven checkpoint selector 112. The checkpoint selector 112 is configured to select checkpoints of a recurrent database job. At compile time of database queries that define the recurrent database job, the checkpoint selector 112 determines temporal indicators associated with query plans that result from compilation of the respective database queries such that one or more temporal indicators are associated with each query plan. Each of the one or more temporal indicators associated with each query plan indicates a first subset of a plurality of stages of the respective query plan that are to have executed by a respective reference time indicated by the respective temporal indicator and a second subset of the plurality of stages of the respective query plan that are not to have executed by the respective reference time. The checkpoint selector 112 predicts values of respective attributes of each stage in at least the first subset of the plurality of stages of each query plan indicated by a first temporal indicator associated with the respective query plan by analyzing historical values of the attributes of the respective stage for each of a plurality of historical executions of the respective stage using a machine learning technique. At the compile time of the database queries, the checkpoint selector 112 identifies one or more candidate stages for each query plan from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan. The checkpoint selector 112 selectively chooses the one or more candidate stages for each query plan that correspond to the first temporal indicator associated with the respective query plan to be one or more respective checkpoints of the recurrent database job based on whether the values of the respective attributes of each stage in at least the first subset of the plurality of stages of the respective query plan indicated by the first temporal indicator associated with the respective query plan satisfy one or more criteria.

The checkpoint selector 112 may use a neural network to perform the machine learning to predict the values of the respective attributes of each stage in at least the first subset of the plurality of stages of each query plan indicated by a temporal indicator associated with the respective query plan. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the checkpoint selector 112 employs a feed forward neural network to train a machine learning model that is used to determine ML-based confidences. Such ML-based confidences may be used to determine likelihoods that events will occur.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network may be capable of storing information, such as the historical values of the attributes of each stage, over time. For instance, the LSTM neural network may generate a recommendation model by utilizing such information. In another example, the LSTM neural network may be capable of remembering relationships between features, such as output size, execution time, start time, end time, and probability of failure of each stage, recommended checkpoints, and amount of time saved as a result of choosing a stage to be a checkpoint, and ML-based confidences that are derived therefrom.

The checkpoint selector 112 may include training logic and inference logic. The training logic is configured to train a machine learning algorithm that the inference logic uses to determine (e.g., infer) the ML-based confidences. For instance, the training logic may provide sample output sizes, sample execution times, sample start times, sample end times, sample probabilities of failure, sample amounts of time saved as a result of choosing stages to be checkpoints, and sample confidences as inputs to the algorithm to train the algorithm. The sample data may be labeled. The machine learning algorithm may be configured to derive relationships between the features (e.g., output sizes, execution times, start times, end times, probabilities of failure, amounts of time saved as a result of choosing stages to be checkpoints, and the recommended checkpoints) and the resulting ML-based confidences. The inference logic is configured to utilize the machine learning algorithm, which is trained by the training logic, to determine the ML-based confidence when the features are provided as inputs to the algorithm.

The checkpoint selector 112 may be implemented in various ways to select checkpoints of a recurrent database job, including being implemented in hardware, software, firmware, or any combination thereof. For example, the checkpoint selector 112 may be implemented as computer program code configured to be executed in one or more processors. In another example, the checkpoint selector 112 may be implemented as hardware logic/electrical circuitry. For instance, the checkpoint selector 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The checkpoint selector 112 is shown to be incorporated in the DBMS 110 for non-limiting, illustrative purposes. It will be recognized that the checkpoint selector 112 may be partially or entirely external to the DBMS 110. For instance, the checkpoint selector 112 or a portion thereof may be hosted directly by any one or more of the servers 106A-106N. The DBMS 110 is shown to be distributed across the servers 106A-106N for non-limiting, illustrative purposes. It will be recognized that the DBMS 110 may be distributed across fewer than all of the servers 106A-106N or incorporated in one of the servers 106A-106N.

Figure 2:
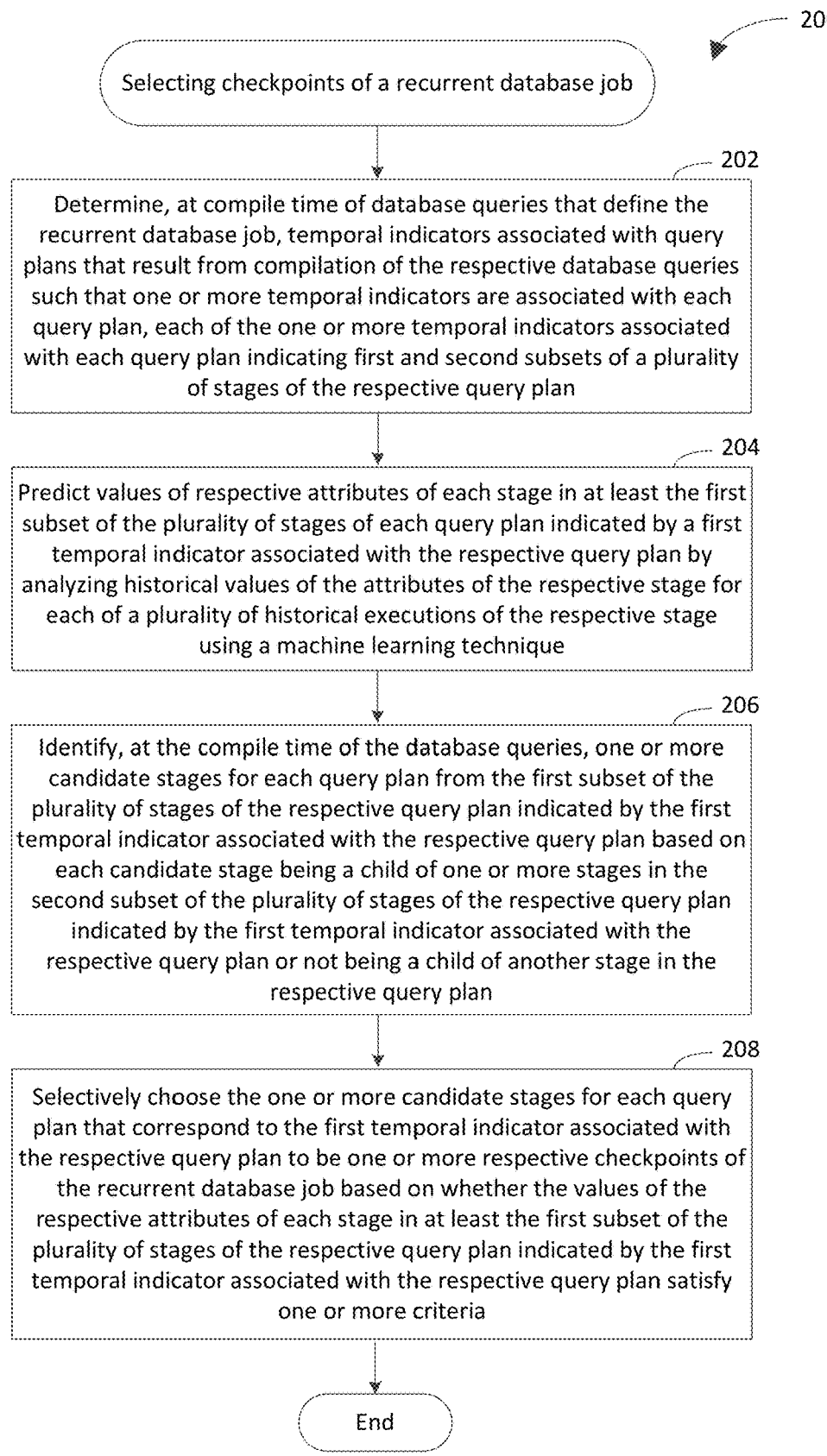
FIGS. 2-3 depict flowcharts of example methods for selecting checkpoints of a recurrent database job in accordance with embodiments.
Figure 3:
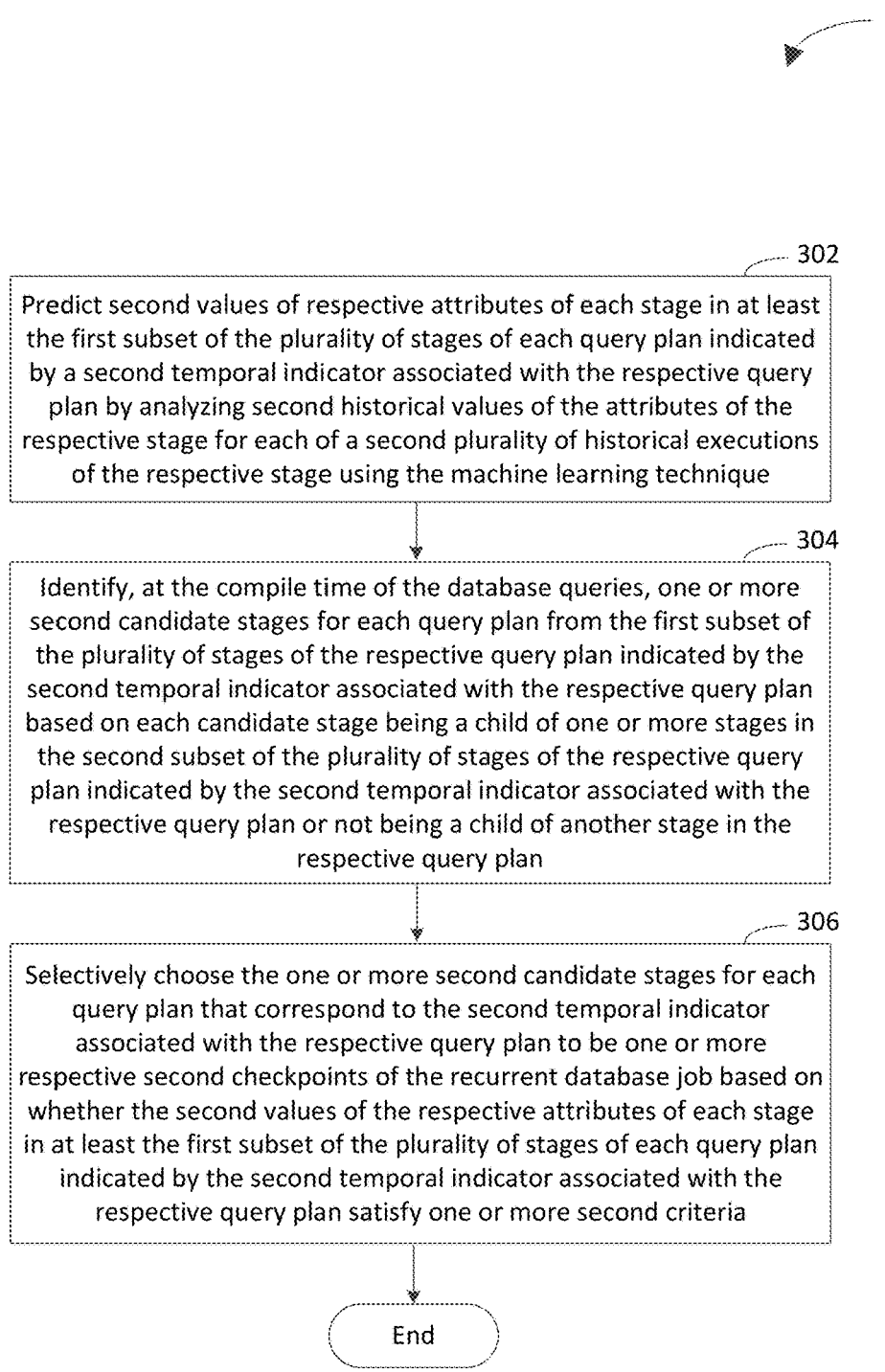
Figure 4:
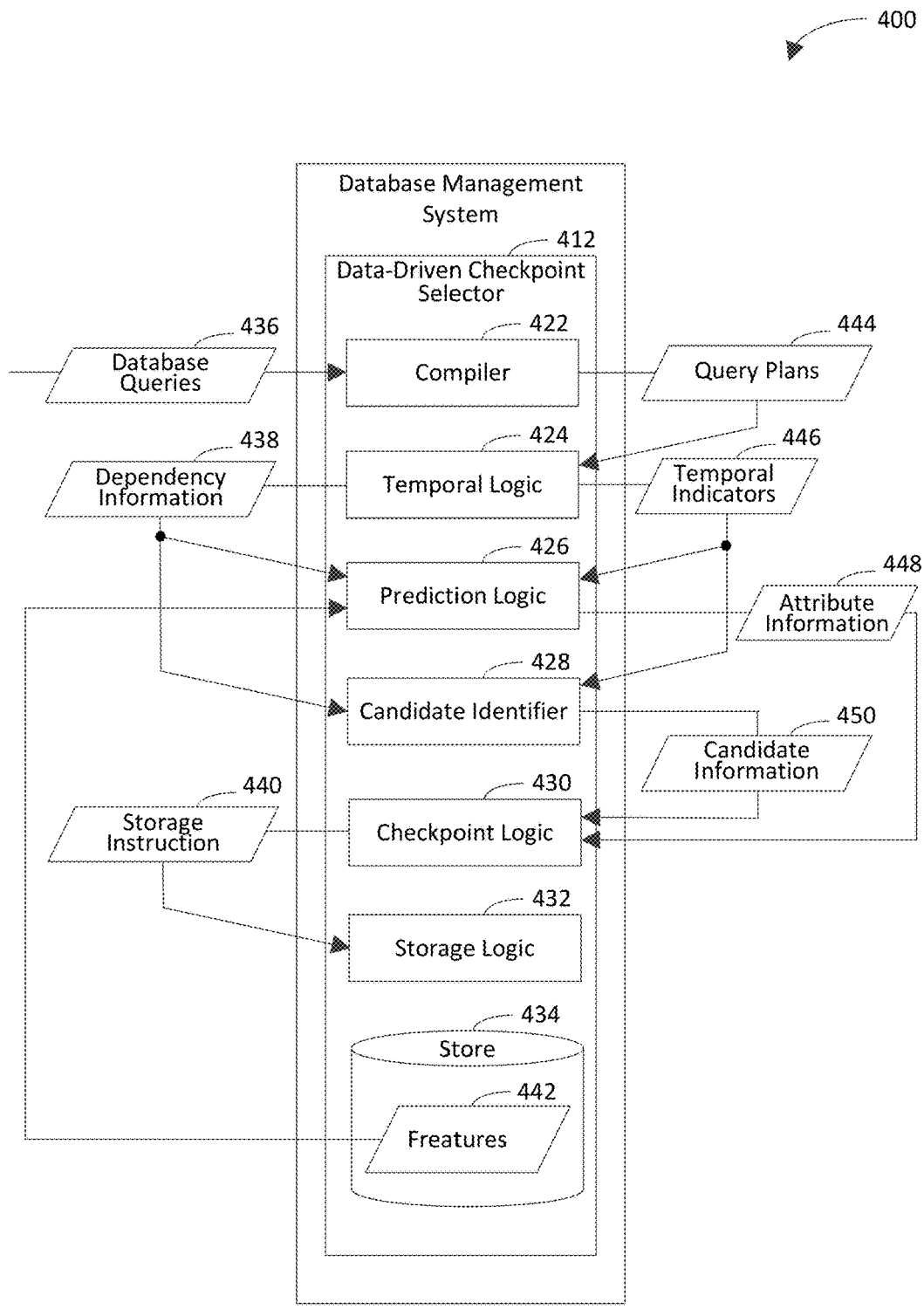
FIG. 4 is a block diagram of a database management system that includes an example implementation of a data-driven checkpoint selector shown in FIG. 1 in accordance with an embodiment.

FIGS. 2-3 depict flowcharts 200 and 300 of example methods for selecting checkpoints of a recurrent database job in accordance with embodiments. Flowcharts 200 and 300 may be performed by the data-driven checkpoint selector 112 shown in FIG. 1, for example. For illustrative purposes, flowcharts 200 and 300 are described with respect to a database management system (DBMS) 400 shown in FIG. 4. The DBMS 400 includes data-driven checkpoint selector 412, which is an example implementation of the data-driven checkpoint selector 112, according to an embodiment. As shown in FIG. 4, the data-driven checkpoint selector 412 includes a compiler 422, temporal logic 424, prediction logic 426, a candidate identifier 428, checkpoint logic 430, storage logic 432, and a store 434. The store 434 can be any suitable type of store. For instance, the store 434 may be a database. Further structural and operational embodiments will be apparent to persons skilled in the relevant art(s) based on the discussion regarding flowcharts 200 and 300.

As shown in FIG. 2, the method of flowchart 200 begins at step 202. In step 202, at compile time of database queries that define the recurrent database job, temporal indicators associated with query plans that result from compilation of the respective database queries are determined such that one or more temporal indicators are associated with each query plan. For instance, each stage may result from compilation of one or more operators (e.g., a respective operator) of the database query from which the query plan that includes the stage results. Each stage includes multiple threads. Each of the one or more temporal indicators associated with each query plan indicates a first subset of a plurality of stages of the respective query plan that are to have executed by a respective reference time indicated by the respective temporal indicator and a second subset of the plurality of stages of the respective query plan that are not to have executed by the respective reference time. The one or more temporal indicators associated with each query plan may include a single temporal indicator or a plurality of temporal indicators. In an example implementation, at compile time of database queries 436 that define the recurrent database job, the temporal logic 424 determines temporal indicators 446 associated with query plans 444 that result from compilation of the respective database queries 436 such that one or more temporal indicators are associated with each query plan. For instance, the compiler 422 may compile the database queries 436 to provide the query plans 444. In accordance with this implementation, the temporal logic 424 may analyze the query plans 444 to determine dependencies among the stages in each query plan. In further accordance, with this implementation, the temporal logic 424 may generate dependency information 438 to indicate (e.g., specify) the dependencies among the stages in each query plan.

At step 204, values of respective attributes of each stage in at least the first subset of the plurality of stages of each query plan indicated by a first temporal indicator associated with the respective query plan are predicted by analyzing historical values of the attributes of the respective stage for each of a plurality of historical executions of the respective stage using a machine learning technique. For instance, the predicted value of an attribute may be an average of the historical values of the attribute. In an example implementation, the prediction logic 426 predicts the values of the respective attributes of each stage in at least the first subset of the plurality of stages of each query plan indicated by the first temporal indicator associated with the respective query plan. For instance, the prediction logic 426 may analyze the temporal indicators 446, the dependency information 438, and/or other features 442 to predict the values of the respective attributes. The features 442 may include current and/or historical information regarding the stages. In accordance with this implementation, the prediction logic 426 may generate attribute information to indicate the values of the respective attributes that are predicted by the prediction logic 426.

In accordance with an embodiment, values of respective attributes of each stage in the second subset of the plurality of stages of each query plan indicated by the first temporal indicator associated with the respective query plan are predicted by analyzing historical values of the attributes of the respective stage for each of a plurality of historical executions of the respective stage using a machine learning technique. For instance, values of attributes of all stages of the query plans may be predicted.

At step 206, at the compile time of the database queries, one or more candidate stages for each query plan are identified from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan. In an example implementation, at the compile time of the database queries 436, the candidate identifier 428 identifies the one or more candidate stages for each query plan from the first subset of the plurality of stages of the respective query plan indicated by the first temporal indicator associated with the respective query plan. For instance, the candidate identifier 428 may analyze the temporal indicators 446 and/or the dependency information 438 to perform the identification. The candidate identifier 428 may generate candidate information 450 to indicate the identified candidate stages.

At step 208, the one or more candidate stages for each query plan that correspond to the first temporal indicator associated with the respective query plan are selectively chosen to be one or more respective checkpoints of the recurrent database job based on whether the values of the respective attributes of each stage in at least the first subset of the plurality of stages of the respective query plan indicated by the first temporal indicator associated with the respective query plan satisfy one or more criteria. For instance, a criterion may be an objective or a threshold. In an example implementation, the checkpoint logic 430 selectively chooses the one or more candidate stages for each query plan that correspond to the first temporal indicator associated with the respective query plan to be one or more respective checkpoints of the recurrent database job. For example, the checkpoint logic 430 may analyze the candidate information 450 and/or the attribute information 448 to determine whether to choose the one or more candidate stages for each query plan that correspond to the first temporal indicator associated with the respective query plan to be one or more respective checkpoints of the recurrent database job. In accordance with this example, by analyzing the candidate information 450, the checkpoint logic 430 may determine which stages are the candidate stages. In further accordance with this example, by analyzing the attribute information 448, the checkpoint logic 430 may determine whether the values of the attributes of the stages satisfy the one or more criteria.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, predicting the values of the respective attributes at step 204 includes predicting a probability that a stage in the second subset of the plurality of stages of each query plan indicated by the first temporal indicator associated with the respective query plan is to fail based on a number of threads in the respective stage, a historic probability of each thread in the respective stage to fail, and a proportion of the stages in the respective query plan in each of the first subset and the second subset of the respective stages. In accordance with this embodiment, predicting the values of the respective attributes at step 204 further includes predicting an amount of time to be saved during a recovery of the recurrent database job as a result of choosing the one or more candidate stages for each query plan that correspond to the first temporal indicator associated with the respective query plan to be one or more respective checkpoints of the recurrent database job. In further accordance with this embodiment, selectively choosing the one or more candidate stages for each query plan at step 208 includes selectively choosing the one or more candidate stages for each query plan that correspond to the first temporal indicator associated with the respective query plan to be one or more respective checkpoints of the recurrent database job based on whether a combination of the probability that a stage in the second subset of the plurality of stages of the respective query plan indicated by the first temporal indicator associated with the respective query plan is to fail and the amount of time to be saved during the recovery of the recurrent database job as a result of choosing the one or more candidate stages to be one or more respective checkpoints of the recurrent database job satisfies the one or more criteria.

In an aspect of this embodiment, selectively choosing the one or more candidate stages for each query plan at step 208 includes selectively choosing the one or more candidate stages for a designated query plan that correspond to the first temporal indicator associated with the respective query plan to be one or more respective designated checkpoints of the recurrent database job by weighing (A) a benefit of increasing the amount of time to be saved during a recovery of the recurrent database job based on a product of (1) the probability that a stage in the second subset of the plurality of stages of the respective query plan indicted by the first temporal indicator associated with the respective query plan is to fail and (2) the amount of time to be saved during the recovery of the recurrent database job as a result of choosing the one or more candidate stages to be one or more respective checkpoints of the recurrent database job against (B) a cost of storing an intermediate output file of each designated checkpoint in a global data store of the database.

In another aspect of this embodiment, predicting the amount of time to be saved during a recovery of the recurrent database job includes predicting the amount of time to be saved during a recovery of the recurrent database job as a result of choosing the one or more candidate stages for a designated query plan that correspond to the first temporal indicator associated with the respective query plan to be one or more respective designated checkpoints of the recurrent database job to be equal to an amount of time from a start of the recurrent database job until a temporally last starting time of one or more starting times of the one or more respective candidate stages of the designated query plan.

In an example of this aspect, predicting the amount of time to be saved during a recovery of the recurrent database job includes predicting a start time of each stage in a dependency chain of each candidate stage of the designated query plan to be same as a temporally last end time of child stages of the respective stage.

In yet another aspect of this embodiment, selectively choosing the one or more candidate stages for each query plan at step 208 includes selectively choosing the one or more candidate stages for each query plan that correspond to the first temporal indicator associated with the respective query plan to be one or more respective checkpoints of the recurrent database job based on whether a product of (1) a probability that a stage in the first subset of the plurality of stages of the respective query plan indicted by the first temporal indicator associated with the respective query plan is to succeed, (2) the probability that a stage in the second subset of the plurality of stages of the respective query plan indicated by the first temporal indicator associated with the respective query plan is to fail, and (3) the amount of time to be saved during the recovery of the recurrent database job as a result of choosing the one or more candidate stages to be one or more respective checkpoints of the recurrent database job is greater than or equal to a threshold value.

In another example embodiment, the method of flowchart 200 further includes categorizing the stages of the query plans among a plurality of stage types based on the stages of each stage type being configured to perform a respective common subset of operations. For example, the temporal logic 424 may categorize the stages of the query plans 444. In accordance with this example, the temporal logic 424 may analyze the stages to determine the operations that each stage is configured to perform. The temporal logic 424 may categorize the stages based on the analysis. In accordance with this embodiment, predicting the values of the respective attributes at step 204 further includes predicting the values of the respective attributes of each stage in at least the first subset of the plurality of stages of each query plan indicated by the first temporal indicator associated with the respective query plan using a plurality of machine learning techniques on the stages that are categorized among the plurality of respective stage types.

In yet another example embodiment, predicting the values of the respective attributes at step 204 includes predicting an output size of an output file of each stage in at least the first subset of the plurality of stages of each query plan indicated by the first temporal indicator associated with the respective query plan based on features correlated to the respective output size. In accordance with this example, predicting the values of the respective attributes at step 204 further includes predicting a time-to-live of each stage in at least the first subset of the plurality of stages of each query plan indicated by the first temporal indicator associated with the respective query plan based on features correlated to the respective time-to-live. In further accordance with this embodiment, selectively choosing the one or more candidate stages for each query plan at step 208 includes selectively choosing the one or more candidate stages for each query plan that correspond to the first temporal indicator associated with the respective query plan to be one or more respective checkpoints of the recurrent database job based on whether a combination of one or more output sizes of one or more respective output files of the one or more respective candidate stages of the respective query plan that correspond to the first temporal indicator associated with the respective query plan and one or more times-to-live of the one or more respective candidate stages of the respective query plan that correspond to the first temporal indicator associated with the respective query plan satisfies the one or more criteria.

In an aspect of this embodiment, selectively choosing the one or more candidate stages for each query plan at step 208 includes selectively choosing the one or more candidate stages for a designated query plan that correspond to the first temporal indicator associated with the respective query plan to be one or more respective designated checkpoints of the recurrent database job by weighing (A) a benefit of deleting an intermediate output file of each stage in the first subset of the plurality of stages of the designated query plan indicated by the first temporal indicator associated with the respective query plan from a local store of a database against which the recurrent database job is executed against (B) a cost of storing an intermediate output file of each designated checkpoint in a global data store of the database.

In another aspect of this embodiment, selectively choosing the one or more candidate stages for each query plan at step 208 includes choosing the one or more candidate stages for a designated query plan that correspond to the first temporal indicator associated with the respective query plan to be one or more respective designated checkpoints of the recurrent database job. In accordance with this aspect, the method of flowchart 200 further includes storing an intermediate output file of each designated checkpoint in a global data store of a database against which the recurrent database job is executed. For example, the storage logic 432 may store the intermediate output file of each designated checkpoint in the global data store. In accordance with this example, the storage logic 432 may perform such storage based on receipt of a storage instruction 440. For instance, the checkpoint logic 430 may generate the storage instruction 440 to instruct the storage logic 432 to store the one or more intermediate output files of the one or more designated checkpoints in the global data store based on the one or more designated checkpoints being chosen.

In further accordance with this aspect, the method of flowchart 200 further includes deleting an intermediate output file of each stage in the first subset of the plurality of stages of the designated query plan indicated by the first temporal indicator associated with the respective query plan from a local store of the database. For example, the storage logic 432 may delete the intermediate output file of each stage in the first subset of the plurality of stages of the designated query plan indicated by the first temporal indicator associated with the respective query plan from a local store of the database. In accordance with this example, the storage logic 432 may perform such deletion based on receipt of the storage instruction 440. For instance, the checkpoint logic 430 may generate the storage instruction 440 to instruct the storage logic 432 to delete the intermediate output file of each stage in the first subset of the plurality of stages of the designated query plan indicated by the first temporal indicator associated with the respective query plan from the local store of the database based on the one or more designated checkpoints being chosen. The information stored by an intermediate output file may be referred to herein as intermediate data, temporary data, or temp data.

In yet another aspect of this embodiment, predicting the time-to-live of each stage in at least the first subset of the plurality of stages of each query plan indicated by the first temporal indicator associated with the respective query plan includes predicting each of one or more times-to-live of the one or more respective candidate stages for each query plan that correspond to the first temporal indicator associated with the respective query plan based on a factor that is equal to a difference between an estimate of a total processing time of the recurrent database job and a temporally last end time of one or more end times of the one or more candidate stages for the respective query plan that correspond to the first temporal indicator associated with the respective query plan.

In an example of this aspect, predicting each of the one or more times-to-live of the one or more respective candidate stages for each query plan that correspond to the first temporal indicator associated with the respective query plan includes predicting a start time of each stage in a dependency chain of each candidate stage to be a temporally last end time of child stages of the respective stage. A dependency chain of a candidate stage includes descendants of the candidate stage (e.g., children, grandchildren, great-grandchildren, and so on). Descendants of a stage may be referred to herein as upstream stages with regard to the stage. The dependency chain of the candidate may further include ancestors of the candidate stage (e.g., parents, grandparents, great-grandparents, and so on), though the scope of the example embodiments is not limited in this respect. Ancestors of a stage may be referred to herein as downstream stages with regard to the stage.

In another example of this aspect, selectively choosing the one or more candidate stages for each query plan at step 208 includes selectively choosing the one or more candidate stages for each query plan that correspond to the first temporal indicator associated with the respective query plan to be one or more respective checkpoints of the recurrent database job based on whether a product of (A) a sum of the one or more output sizes of the one or more respective output files of the one or more respective candidate stages of the respective query plan that correspond to the first temporal indicator associated with the respective query plan and (B) a least time-to-live of the one or more times-to-live of the one or more respective candidate stages of the respective query plan that correspond to the first temporal indicator associated with the respective query plan is greater than or equal to a threshold value. It will be recognized that a threshold value may be a specified threshold value, a predetermined threshold value, a fixed threshold value, a dynamic threshold value (a.k.a. variable threshold value), or other suitable type of threshold value.

In still another example embodiment, each query plan is associated with multiple temporal indicators that include a first respective temporal indicator and a second respective temporal indicator. In accordance with this embodiment, the method of flowchart 200 further includes one or more of the steps of flowchart 300 shown in FIG. 3. As shown in FIG. 3, the method of flowchart 300 begins at step 302. In step 302, second values of respective attributes of each stage in at least the first subset of the plurality of stages of each query plan indicated by a second temporal indicator associated with the respective query plan are predicted by analyzing second historical values of the attributes of the respective stage for each of a second plurality of historical executions of the respective stage using the machine learning technique. For example, the prediction logic 426 may predict the second values.

At step 304, at the compile time of the database queries, one or more second candidate stages for each query plan from the first subset of the plurality of stages of the respective query plan indicated by the second temporal indicator associated with the respective query plan are identified based on each candidate stage being a child of one or more stages in the second subset of the plurality of stages of the respective query plan indicated by the second temporal indicator associated with the respective query plan or not being a child of another stage in the respective query plan. For instance, at the compile time of the database queries 436, the candidate identifier 428 identifies the one or more second candidate stages for each query plan.

At step 306, the one or more second candidate stages for each query plan that correspond to the second temporal indicator associated with the respective query plan are selectively chosen to be one or more respective second checkpoints of the recurrent database job based on whether the second values of the respective attributes of each stage in at least the first subset of the plurality of stages of each query plan indicated by the second temporal indicator associated with the respective query plan satisfy one or more second criteria. For example, the checkpoint logic 430 may selectively choose the one or more second candidate stages for each query plan that correspond to the second temporal indicator associated with the respective query plan to be one or more respective second checkpoints of the recurrent database job. It will be recognized that the plurality of historical executions of each stage mentioned in step 204 of flowchart 200 and the second plurality of historical executions of the respective stage mentioned in step 302 of flowchart 300 may be same or different. It will be further recognized that the one or more criteria mentioned in step 208 of flowchart 200 and the one or more second criteria mentioned in step 306 of flowchart 300 may be same or different.

In an aspect of this embodiment, integer programming is used to selectively choose the one or more candidate stages for each query plan at step 208 and to selectively choose the one or more second candidate stages for each query plan at step 306. For instance, the checkpoint logic 430 may use integer programming to selectively choose the one or more candidate stages for each query plan at step 208 and to selectively choose the one or more second candidate stages for each query plan at step 306.

It will be recognized that the data-driven checkpoint selector 412 may not include one or more of the compiler 422, the temporal logic 424, the prediction logic 426, the candidate identifier 428, the checkpoint logic 430, the storage logic 432, and/or the store 434. Furthermore, the data-driven checkpoint selector 412 may include components in addition to or in lieu of the compiler 422, the temporal logic 424, the prediction logic 426, the candidate identifier 428, the checkpoint logic 430, the storage logic 432, and/or the store 434.

In an example implementation, a big data analytics platform includes hundreds of thousands of machines and executes hundreds of thousands of jobs per day. Users of the platform submit their analytical jobs using the SCOPE query language, which is a SQL-like dialect that gets compiled into massive distributed execution workflows. The platform provides petabytes of telemetry data on a daily basis, recording the detailed execution plan, the schedule of each stage, the execution time and output/input size of each stage, the type of operators involved, vertex failures, etc. for each job that is executed by the platform. For intra-job fault-tolerance, the platform implements a proprietary Replicated State Library (RSL) for recovering from failed tasks. The transaction logs and the full-incremental backups of log and intermediate output files are saved to the local temporary storage of each server. For instance, the local temporary storage of each server may include solid-state devices (SSDs).

Figure 5:
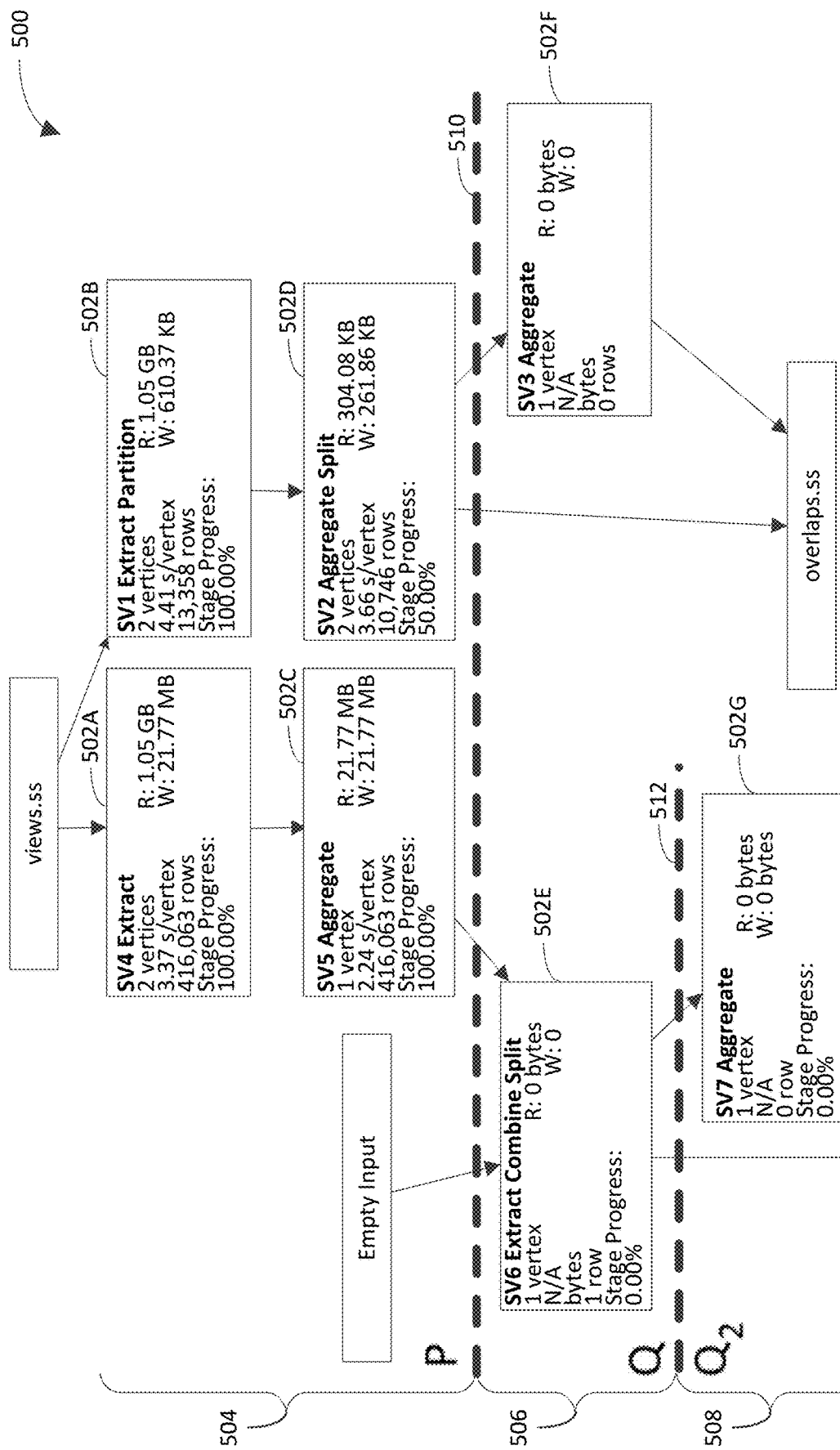
FIG. 5 is a block diagram of an example execution plan for a SCOPE job in accordance with an embodiment.

FIG. 5 is a block diagram of an example execution plan 500 for a SCOPE job in accordance with an embodiment. As shown in FIG. 5, the execution plan 500 has a plurality of stages 502A-502G. Temporal indicators 510 and 512 are shown to divide the stages 502A-502G among a first subset 504, a second subset 506, and a third subset 508 for non-limiting, illustrative purposes. The first subset 504 includes stages 502A-502D. The second subset 506 includes stages 502E-502F. The third subset 508 includes stage 502G. During the execution of the execution plan 500, a user can monitor the progress of each stage. For example, stages 502A-502D may be shown using various colors to represent respective states. In accordance with this example, stages 502A-502D may be shown using a first color to indicate that the stages 502A-502D have at least begun executing. An extent to which a stage is colored using the first color may correspond to an extent to which execution of that stage has completed. Stage 502E may be shown in a second color to indicate that the stage 502E is waiting (e.g., in queue) to begin execution. Stages 502F-502G may be shown in a third color (e.g., white) to indicate that the stages 502F-502G are not yet in queue to begin execution.

Each stage may run in parallel as tasks on respective data partitions. Each task may correspond to a container running on a server, called vertex. A stage may include multiple operators, such as Filter, Output, HashJoin, etc., chained together. Based on execution dependency, the dependee (a.k.a. child) may be referred to as an upstream stage, and the dependent (a.k.a. parent) may be referred to as a downstream stage. For instance, stage 502C is an upstream stage of stage 502E and a downstream stage of stage 502A. An upstream stage usually (but not always) finishes before its downstream stage. When a stage finishes, its output is saved to temporary storage locally. In case downstream stages fail, the temporary data from their upstream stages will be recursively used for retrying the execution.

Given the motivation to create persistent checkpoints, the SCOPE execution graph can be decomposed to select a set of stages for global checkpointing and redirect their outputs to global data storage on a hard disk drive (HDD). These stages are referred to as checkpoint stages. It is desirable to select the checkpoint stages carefully such that objectives may be maximized while global store consumption does not exceed a designated capacity. Finding the optimal checkpoint stages is similar to decomposing the execution plan and finding a cut in the graph. Based on the first temporal indicator 510, stages 502C and 502D are selected as global checkpoints when stage 502C finishes executing at time t. Based on the downstream stages 502E-502G, which have not been executed, the outputs from stages 502C and 502D are saved to the global persistent store. The space needed for the global store is equal to the sum of the output sizes of 502C and 502D.

A goal may be to minimize the overall temp store load of all jobs subject to global storage constraints. Note that time-to-live for a stage, $t_u$, is a function of the runtime of other stages in the stage graph, i.e., $t_u=f(r_1, r_2, \ldots r_k)$. Accurate estimations of $o_u$, $r_u$, and $t_u$ are therefore key to good checkpointing optimization. Thus, in the following discussion, an overview of an example architecture of a data-driven checkpoint selector (e.g., data-driven checkpoint selector 112 or 400) is provided, followed by a discussion of machine learning (ML) models for stage-wise costs ($o_u$ and $r_u$) and time-to-live predictions ($t_u$) and a discussion of example checkpoint optimization algorithms.

In some example embodiments, to determine the optimal cut(s) of an execution graph, the output size, the runtime, and the time-to-live for each stage may be estimated. In big data systems, the estimates from the query optimizer may be off by orders of magnitude due to large query execution DAGs where the errors propagate exponentially, prevalent use of custom user defined functions that are hard to analyze, and the presence of both structured and unstructured input data. Workload patterns may be used to learn models for improving the query optimizer estimates at each operator level. For checkpointing, however, the costs at the stage-level (e.g., set of operators executing on the same container) is estimated. Operators within a stage may be pipelined in different ways, which makes it non-trivial to combine individual operator costs into stage costs. Therefore, newer machine learning models may be introduced for stage-wise costs. Compared to operators, the stages are executed physically in containers with explicit boundaries that make them more amenable for learning costs models. Once the stage costs are learned, those stage costs are used to predict the time-to-live for each stage. The time-to-live for each stage may be used to estimate the savings from checkpointing each of the stage outputs dynamically. A checkpoint optimizer may use the estimators described above to make final checkpointing decisions.

In the embodiment of FIG. 5, the execution plan 500 is shown to have seven stages 502A-502G for non-limiting, illustrative purposes. It will be recognized that the execution plan 500 may have any suitable number of stages (e.g., 1, 2, 3, and so on).

Figure 6:
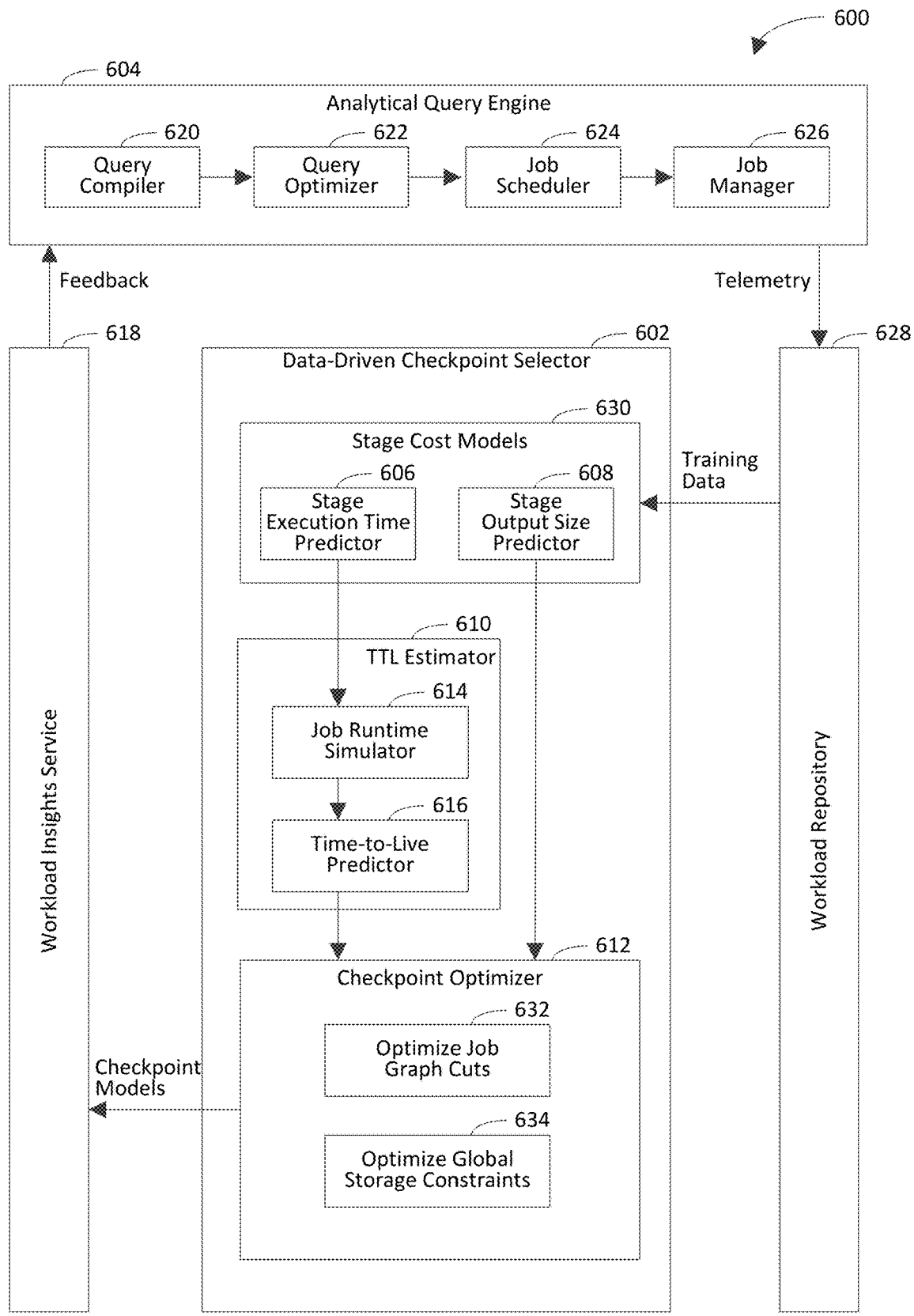
FIG. 6 is a block diagram of an example architecture of a data-driven checkpoint selector integrated into an example workload optimization platform in accordance with an embodiment.

FIG. 6 is a block diagram of an example workload optimization platform 600 in accordance with an embodiment. As shown in FIG. 6, the workload optimization platform 600 includes a data-driven checkpoint selector 602, an analytical query engine 604, a workload insights service 618, and a workload repository 628. The data-driven checkpoint selector 602 includes stage cost models 630, a time-to-live (TTL) estimator 610, and a checkpoint optimizer 612. The stage cost models 630 include a stage execution time predictor 606 and a stage output size predictor 608. The stage execution time predictor 606 takes as input the aggregated features at the stage level and uses machine learning methods to predict the duration of each stage, which is measured by the average vertex execution time for all the vertices of the corresponding stage. The stage output size predictor 608 takes the same input features as the stage execution time predictor and makes predictions for the output size of each stage, which is measured by the size of the outputs for the last operator of the corresponding stage.

The time-to-live estimator 610 includes a job runtime simulator 614 and a time-to-live predictor 616. The job runtime simulator 614 emulates the execution of a job and infers the starting and ending times for each stage based on the execution graph of all stages. An assumption can be made that a stage can start only if all the upstream stages have completed execution. The TTL can be calculated as the time interval between the estimated stage ending time and the estimated job ending time. The time-to-live predictor 616 is a meta-learning model to further improve on the prediction for the TTL. Similar to model stacking, the time-to-live predictor 616 takes the estimated TTL and the estimated time from start (TFS, defined as the time interval from the job starting time to the starting time of a stage from the job runtime simulator), and uses another machine learning model to predict the TTL.

The checkpoint optimizer 612 uses as input the estimated TTL and the output size of each stage and selects the optimal set of global checkpoints to achieve the desired objective (e.g., maximize the saving for the temp data storage and/or minimize the recovery time from a failure). The checkpoint optimizer 612 includes a job graph cuts optimizer 632 and a global storage constraints optimizer 634. The job graph cuts optimizer 632 is configured to select cuts (i.e., temporal indicators) from which candidate stages (i.e., candidates for becoming checkpoints) are to be identified. The global storage constraint optimizer 634 is configured to optimize an amount of intermediate data that is stored in the global store. For instance, the global storage constraints optimizer 634 may analyze the amount of intermediate data associated with candidate stages to determine whether the intermediate data is to be redirected to the global store based on storage constraints associated with the global store.

The analytical query engine 604 includes a query compiler 620, a query optimizer 622, a job scheduler 624, and a job manager 626. For a new job, the SCOPE query compiler 620 makes a call to the workload insight service 618, determines the checkpoint stages. The query compiler 620 provides information that identifies the checkpoint stages to the job scheduler 624. The query optimizer 622 optimizes queries that are received from the query compiler. The job scheduler 624 provides the information that identifies the checkpoint stages to the job manager 626. The job manager 626 manages the process of checkpointing the checkpoint stages to the global store (e.g., by sending the intermediate output files of those checkpoint stages to the global store).

The workload insights service 618 receives checkpoint models from the checkpoint optimizer 632 and provides information that indicates the checkpoint stages to the query compiler 620 in response to a call from the query compiler 620. The workload repository 628 stores the telemetry data from the analytical query engine 604 so that the telemetry data can be used later by the data-driven checkpoint selector 602 to retrain the models.

Example stage-level cost models will now be discussed. The cost models may be used to predict the stage execution time and the output size. For instance, the stage execution time predictor 606 may use a first model to predict the stage execution time, and the stage output size predictor 608 may use a second model to predict the output size. The same model structure may be used for both predictors, though the example embodiments are not limited in this respect. A Deep Neural Net (DNN) model and a classic machine learning (ML) model may be based on LightGbm using the NimbusML implementation, which is an open-sourced machine learning package in Python that provides a Python binding for ML.NET. Following is a discussion of the features used for the predictors, followed by a description of the DNN and LightGBM models for stage wise costs.

Compile-time features are collected from the query optimizer. Historic patterns and metrics of the stages are also leveraged. For instance, historic average metrics for each combination of job templates and operators may be extracted and used as features. Such information may be quite useful for recurrent jobs. The input file paths often encode the business application. The input file paths therefore may be used as features, as well. Features may be categorized into groups. For instance, a first group may include query optimizer features, including estimates such as Estimated Cost, Estimated Input Cardinality, Estimated Exclusive Cost, and Estimated Cardinality for the last two operators in the stage. It may be desirable to encode the position of the operator in the column index. A second group may include historic statistics, such as Exclusive Time and the Output Size for the same job template and operator combination (e.g., the average exclusive time for an Extract operator in the job template for GenDailyLogData Date XX-XX for the past month). The operator level aggregates may be pivoted to a vector (each entry corresponds to a specific type of operator similar to a One Hot Encoding operation. The job template is extracted from the NormJobName which marks the job specific characters, such as date, time, counts, etc. A third group includes the normalized input file path for the last two operators. This feature may be used for the Deep Neural Net (DNN) models (e.g., and not for the LightGBM models) as it is a string instead of numeric. Similar to the Norm Job Name, the Norm Input Name may be extracted from the path of the input file, and the job specific characters, such as date, bucket numbers, etc. may be marked. This feature reveals information on the input file (e.g., the type of file), which has different processing speeds in the system.

Table. 1 summarizes the features.

TABLE 1

| Cost model features | |
|---|---|
| Feature Group | Feature Name |
| Query Optimizer Features | Estimated Cost, Estimated Input Cardinality, Estimated Exclusive Cost, and Estimated Cardinality for the last two operators |

TABLE 1-continued

| Cost model features | |
|---|---|
| Feature Group | Feature Name |
| Historic Statistics | Exclusive Time and the Output Size for the same job template and operator combination |
| Normalized File Path/Job Name | Norm Job Name, Norm Input Name |

The Norm Input Name and the Norm Job Name are text features and might have millions of possible values. A simple One Hot Encoding is not applicable. Using DNN, word embedding can be used for as featurization. A typical word embedding such as GloVe or pre-trained FastText may not be appropriate because the input text is a relatively long file name without spaces, which may not be in the scope for the pre-trained models. Instead, a customized word embedding may be trained by pre-training a language model given the objective to predict the next char using the collection of corps and use the final layer's outputs as the vectorized feature in the full model.

Figure 7:
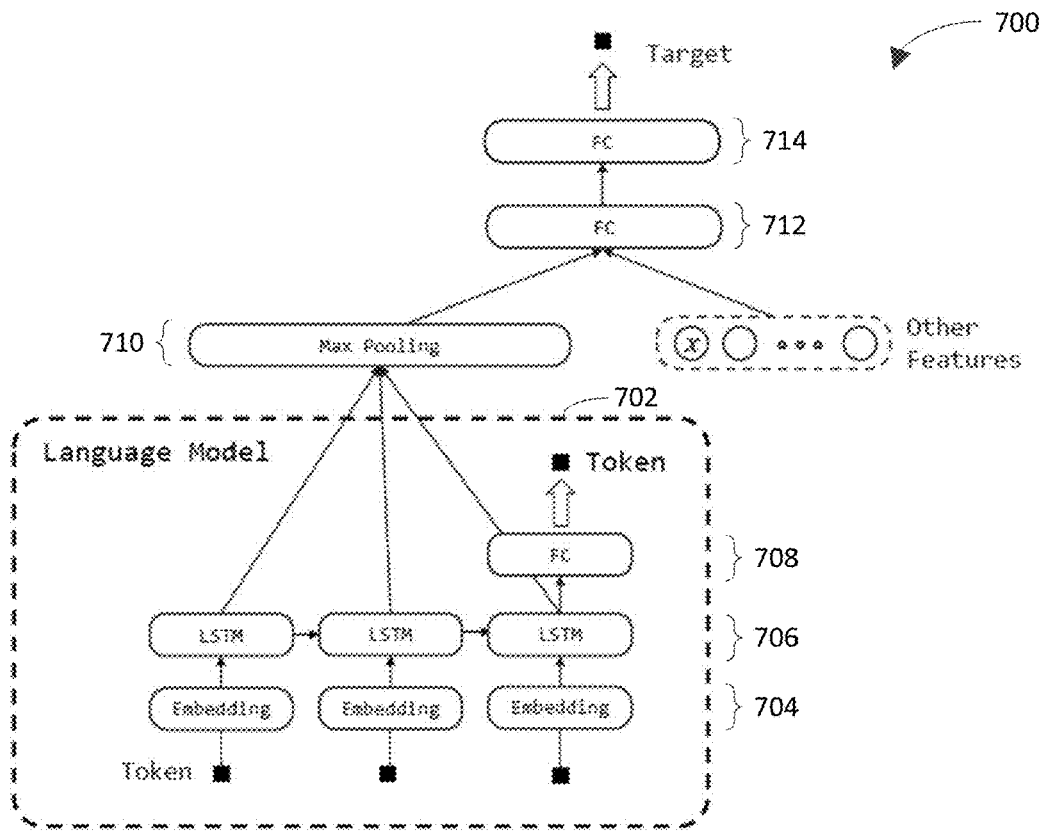
FIG. 7 is a block diagram of an example architecture of a full DNN model 700 and corresponding layers in accordance with an embodiment.

FIG. 7 is a block diagram of an example architecture of a full DNN model 700 and corresponding layers in accordance with an embodiment. The DNN model 700 includes a language model 702. The language model 702 includes (1) an embedding layer 704 to convert each token's One Hot vector to embedded features, (2) a Long Short Term Memory (LSTM) layer 706, and (3) a fully-connected layer 708 to predict the probability of each character, which is a common DNN model structure. After pre-training the language model 702, the hidden cell outputs from the LSTM layer 706 may be used as inputs to a max pooling layer 710 for the full model and concatenated with the other numeric features. Two fully-connected layers 712 and 714 may be used at the end to predict the final target (i.e. the execution time and the output size for each stage). The layers in the language model 702 may be further fine-tuned in the training process of the full model.

NimbusML is an open-sourced Python package developed by Microsoft, which is a Python binding for the ML.NET project. ML.NET is able to handle datasets much larger than the computer memory with superior processing speed with the introduction of virtual views and row cursor.

A variety of ML learners from NimbusML, including Light-GBM learner, were tested to determine their performance. A general model and a stage type specific model were developed using the same features described above. As with the DNN model, the general model is usable for all stage types. One model may be used for the prediction of stage execution time, and one model may be used for stage output size. However, the performance of the general model may not be as accurate as the DNN model. While the DNN model has the ability to incorporate text features, it can potentially capture more characteristics of the job and make better predictions. The stage type specific model is trained for each particular stage type. The intuition is to train the model with more homogeneous data (i.e., using only the data samples from one particular stage type). Such models capture different characteristics of different stage types. For instance, an Extract stage may be more computationally intensive and therefore may have a longer execution time than other types of stages.

The end-to-end model training process may be hosted on any suitable platform, such as Azure® ML. For instance, Azure® ML may provide better experiment tracking and model archiving than other platforms.

Referring back to FIG. 6, example embodiments of the TTL estimator 610 will now be described in further detail. The TTL estimator 610 may predict the temp store load of each stage in the execution graph. The job runtime simulator 614 in the TTL estimator 610 takes as input (1) the stage execution time estimated by the stage execution time predictor 606 and (2) the execution graph indicating the dependency relationship between stages. The time-to-live predictor is another machine learning model that is configured to improve the TTL prediction based on the estimated TTL and the estimated time from start (TFS) from the job runtime simulator 614, with TFS being the time interval between the starting time of the job to the starting time of the stage. This approach is similar to meta-learning by stacking machine learning models for improving the prediction accuracy.

The job runtime simulator 614 is configured to mimic the end-to-end execution for all the stages in an execution graph. The job runtime simulator 614 estimates the start and end time of each stage based on the stage execution time predictions and the dependency relationship in the execution graph. A strict stage boundary may be assumed, meaning that a stage can start only if all its upstream stages have completed execution. Starting from stages without any upstream stage (i.e., the stages in the top of the execution plan, such as the execution plan 500 shown in FIG. 5), enumeration may be performed over the downstream stages recursively, and the downstream stages may be scheduled to start right after all their upstream stages have completed execution. A topological sorting algorithm may be implemented to sort all stages in a linear order, based on the execution graph, such that an upstream stage executes before a downstream stage. A schedule simulator may be implemented to use the linear ordering of the stages and to estimate the start and end times of the stages. For each stage, the job runtime simulator 614 calculates its starting time based on the maximum ending time of all its upstream stages and estimates its ending time based on the estimated stage execution time from the stage execution time predictor 606.

Algorithm 1 represents an example schedule simulator process. Based on the linear ordering from the topological sorting algorithm, stages may be scheduled consecutively from the front of the ordered stack (from position 0) and moving toward the end. When scheduling a stage, downstream stages of the stage need not necessarily be examined. For instance, only upstream stages of the stage may be examined, and all of them should have been scheduled due to the nature of this sorting. The starting time of a stage may be equal to the maximum ending times for its upstream stages (if any), and its ending time may be equal to the starting time plus the estimated stage execution time.

```
Algorithm 1: ScheduleSimulator

Input       :execution graph G, ordered stack R, estimated
             execution time T
Output      :starting time for stages D[s]
             ending time for stages P[s]
Initialize  :D[s] =Null, ∀s ∈ R
             P[s] =Null, ∀s ∈ R
foreach stage s ∈ R do
|    MaxUpstreamEndTime = 0
|    if s.UpstreamStages!- Null then
|    |    foreach upstream ∈ s.UpstreamStages do
|    |    |    MaxUpstreamEndTime =
|    |    |_   max {MaxUpstreamEndTime, P[upstream]}
|    D[s] = MaxUpstreamEndTime
|_   P[s] = D[s] + T[s]
return D, P
```

Based on the estimated starting time and the ending time of the stages, the estimated job ending time can be calculated as the maximum of the stage ending times, and the TTL can be calculated as the time interval between the stage ending time and the job ending time.

The job runtime simulator 614 assumes a strict stage boundary, which might bias the results since some vertices of a stage can start before all the vertices of upstream stage finish. Strict stage boundary assumption is helpful for computation efficiency; however, it may result in biasing the estimation for TTL from the job runtime simulator 614. Thus, an adjuster model may be used as a stacking model to improve the estimation for the TTL.

The input feature for the stacking model includes the estimated TTL from the simulator and the time from start (TFS), which is defined as the time interval between the starting time of the job and the starting time of the corresponding stage. The estimated TTL and the TFS define the "position" of this stage throughout the execution of the job. A model per stage-type may be used to achieve better accuracy based on the LightGbm learner from NimbusML.

Figure 8:
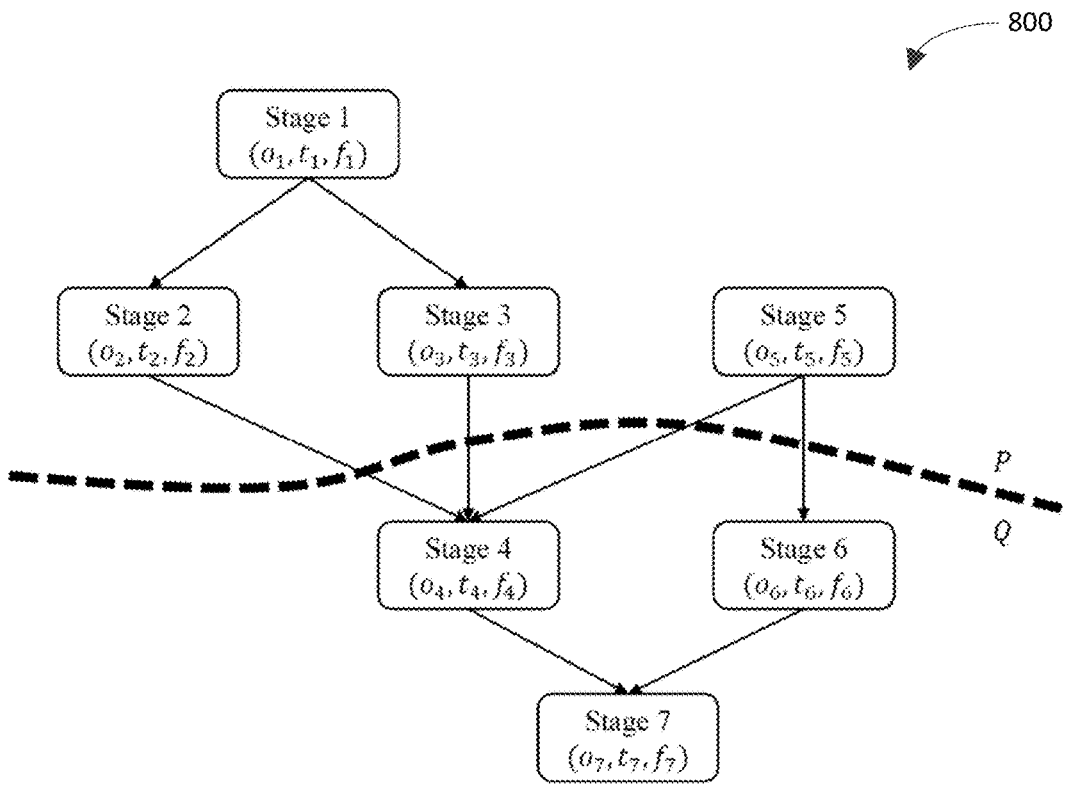
FIG. 8 depicts an example query plan with an associated temporal indicator (a.k.a. cut) in accordance with an embodiment.

The checkpoint optimizer 612 may be configured to find the optimal set of global checkpoints. The problem is similar to finding a cut in the job graph, and the stages in a job graph can therefore be categorized into multiple groups, e.g., Group I, Group II, and Group III. Group I includes the checkpoints stages (e.g., stages that are to redirect their outputs to the global storage). Group II includes stages that have finished executing before the checkpoint stages. Group III includes stages that will be executed after checkpoint stages. To illustrate the aforementioned grouping, we turn to FIG. 8, which depicts an example query plan 800 with an associated temporal indicator (a.k.a. cut) 802 in accordance with an embodiment. The query plan 800 includes stages 1-7. In the embodiment of FIG. 8, stages 2, 3, and 5 are included in Group I; stage 1 is included in Group II; and stages 4, 6, and 7 are included in Group III.

Note that different checkpointing applications might have different objective functions and the problem formulation is extensible. For instance, the example embodiments are applicable to any of a variety of applications, such as freeing up local SDDs in hotspots and quickly restarting failed jobs. Below, an example integer programming (IP) formulation of a single-cut checkpointing problem is described. Further discussion is then provided to show how it can be extended for multiple cuts. To solve the IP efficiently, the formulation may be split into two sub-problems: (1) a heuristic approach to solve the IP without considering the cost of global storage and with only one cut and (2) enforcing the global capacity constraints.

Let us consider the case of adding one cut in the job graph. For stage u, assume its output size is $o_u$ ($\geq 0$), time-to-live (TTL) ty ($\geq 0$) and its total number of downstream stages $f_u$ ($\geq 0$) are known.

Let $z_u$, $\forall u \in S$ be a set of binary decision variables representing whether stage u is executed before the graph cut, i.e., on the side of P (e.g., $z_u=1$ indicates that stage u is before the cut). Let $d_{uv}$, $\forall (u,v) \in E$ be another set of decision variables representing whether edge (u,v) is on the cut, where E denotes the set of edges in this execution plan. For instance, in FIG. 8, $d_{24}$, $d_{34}$, $d_{54}$ and $c_{156}=1$. The total number of decision variables is and the number of possible combinations is $2^{|S|+|E|}$ as they are all binary.

The two sets of binary decision variables decide the grouping of a stage u:

Group I: $z_u=1$ and $d_{uv}=0$, $\forall (u,v) \in E$,
Group II: $z_u=1$ and $\exists d_{uv}=1$, $\forall (u,v) \in E$, and
Group III: $z_u=0$.

The space needed for global storage is the sum of the total output sizes for stages in Group II. By letting M be a sufficiently large number, the checkpoint optimization problem can be formulated as an integer programming (IP) as follows:

$$\max_{\substack{z_u, \forall u \in S \\ d_{uv}, \forall (u,v) \in E}} Obj(z_u, d_{uv}) \quad (1)$$

$$\text{s.t.} \quad G = \sum_{u \in S} o_u g_u, \quad (2)$$

$$g_u \geq d_{uv}, \forall (u, v) \in E, \forall u, \quad (3)$$

$$d_{uv} - z_u + z_v \geq 0, \forall (u, v) \in E, \quad (4)$$

$$d_{uv} \in \{0, 1\}, \forall (u, v) \in E, \quad (5)$$

$$z_u \in \{0, 1\}, \forall u \in S. \quad (6)$$

Equation (1) can be replaced by any suitable objective functions depending on the applications. Constraint (2) calculates the total global storage needed from stages in Group II. It can be estimated by examining the output size on the upstream side of the edges on that cut. In Constraint (3), $g_u=1$ for stages that have any edges on the cut ($d_{uv}=1$). Note that this requires that the objective function aims to minimize G and $g_u$.

Constraint (4) ensures that if stage u is on the side before the cut (the side of P) and v is after the cut (the side of Q), $d_{uv}=1$.

The runtime of solving a large IP can be long. Therefore, a heuristic-based solution may be used to solve the IP formulation in a scalable manner. A goal may be to maximize the objective and apply global storage constraint separately, i.e., ignore the cost of using global storage when determining the cuts and consider adding only one cut. As a result, the IP formulation reduces to have only one set of decision variables, $z_u \forall u \in S$, as illustrated below:

$$(OptCheck) \max_{z_u, \forall u \in S} T \quad (6)$$

$$\text{s.t.} \quad T = \sum_{u \in S} o_u w_u, \quad (7)$$

$$w_u \leq t + M(1 - z_u), \forall u \in S, \quad (8)$$

$$w_u \leq M z_u, \forall u \in S, \quad (9)$$

$$t \leq t_u + M(1 - z_u), \forall u \in S, \quad (10)$$

$$z_u \in \{0, 1\}, \forall u \in S. \quad (11)$$

Reducing the IP formulation in this manner may be performed for some applications and not for others. For instance, the IP formulation may be reduced in this manner for a temp data saving application but not for a recovery time saving application.

The reduction described above has the following property: For any model primitives $t_u$ and $o_u$, there exists optimal solutions $z^*$ of problem OptCheck such that there exists $v \in S$ such that $z^*u=1, \forall u \in S: t_u \geq t_v$ and $z^*u=0, \forall u \in S: t_u < t_v$. This may be proved by contradiction. Suppose there exists an optimal solution $z'$ such that there exists $u, u' \in S$, such that $z_u'=0, z'_{u'}=1$ and $t_u > t_{u'}$. A new solution $z^*$ may be constructed as follows:

$$z_u^* = 1, \quad (14)$$

$$z_v^* = z_v', \forall v \neq u. \quad (15)$$

$$\sum_{v \in S: z_v^*=1} o_v \min_{u: z_u^*=1} t_u = \sum_{v \in S: x_v^*=1} o_v \min_{u: z_u^*=1} t_u \geq \sum_{u: z_v'=1} o_v \min_{u: z_u^*=1} t_u. \quad (16)$$

This indicates that for any optimal solutions $z'$ that does not satisfy the conditions stated in the proposition, we can always find another $z^*$ with at least the same objective value.

The different combinations for $z_u$ can therefore be enumerated for all the stages. Specifically, we can start from the first stage (ordered by TTS) and set its $z_u$ to 1 and the others to 0. More stages can be added to the side before the cut with their $z_u$ set to 1 sequentially, and the corresponding objective function may be evaluated for each solution. In this sense, it is equivalent to finding the optimal time stamp before which all stages have $z_u=1$ and the number of total combinations is $|S|$. The consideration for global storage cost will be discussed below as a separate step.

An example implementation of this enumeration process will now be described. Considering the execution process of a query job, after each stage finishes, the corresponding output will be saved to the temp data storage. Therefore, the total size of the temp data storage being used is increasing monotonically in time as more stages complete execution. Assuming that at the ending time for stage s, the temp data storage is cleared for all the previous stages, the resulting saving for the temp data storage is equal to the TTL for this stage multiplied by the current temp storage usage size. The global storage space needed for Group III stages can be inferred based on the current execution status for each stage according to the same rules as discussed. It may be desirable to check their output files to global storage in case their downstream stages fail in the future.

Figure 9:
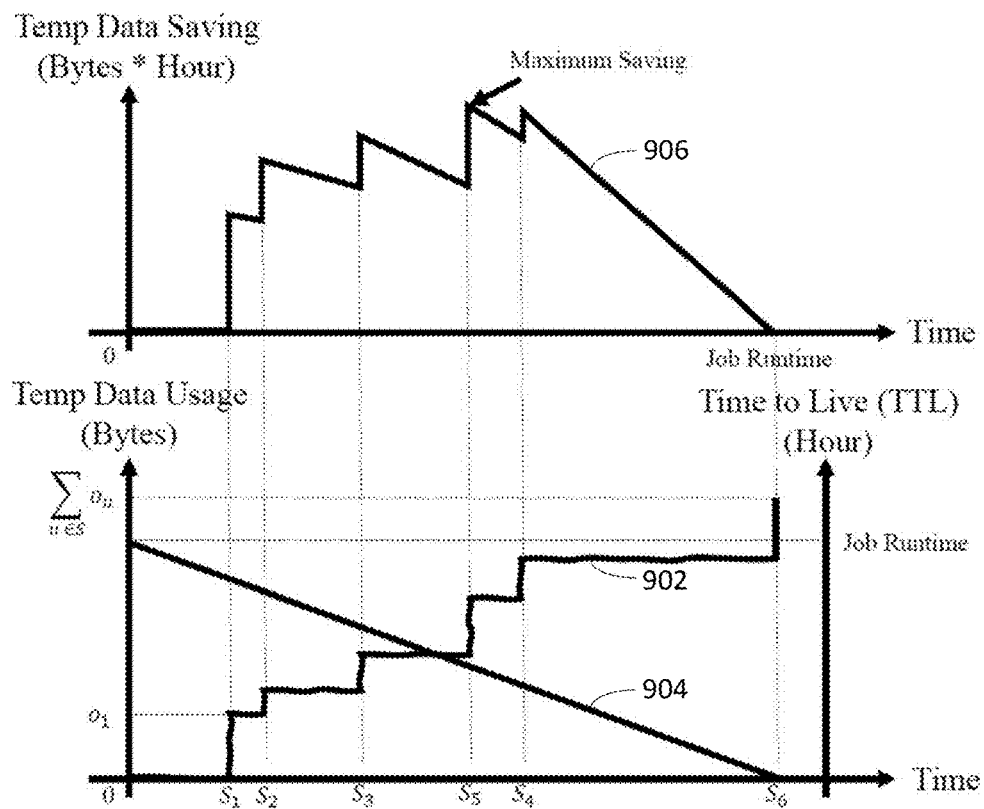
FIG. 9 shows plots of the total temp data usage, the TTL, and the potential temp data saving as a function of time in accordance with an embodiment.

Local SSDs may be freed in hotspots. The temp data saving may be defined as the product of the shortest TTL and the sum of the total output sizes for stages in Group I and II, $\Sigma_{v \in S: z_v = 1}^{o_v} \min_{u: z_u=1} t_u$, i.e., the objective may be given as $\max_{z_u} \forall_{u \in S} \Sigma_{u \in S} o_u w_u$. FIG. 9 shows plots 902, 904, and 906 of the total temp data usage, the TTL, and the potential temp data saving, respectively, as a function of time in accordance with an embodiment. Ordering the stages based on their ending time, the temp data usage may be calculated as the cumulative sum of the output sizes according to their stage ending times. Every time a stage finishes, the temp data usage increases by the output size of this stage. At the end of the job execution, the total usage is equal to the sum of the output sizes for all stages. As time goes by, the TTL decreases linearly. When the job starts, the TTL is equal to the job execution time. When the last stage finishes executing, the TTL is equal to zero. The potential temp data saving may be defined as the product of the two curves (i.e., plots 902 and 904). Based on this logic, for each stage, we can estimate the potential temp data saving and enumerate over all stages to find the maximum using brute-force, ignoring the cost due to the usage on global storage.

In FIG. 9, if the highest saving happens after stage 5 finishes, assuming that the execution graph is as shown in FIG. 8, the temp data saving is equal to the TTL for stage 5 multiplied by the sum of the output sizes for stages 1, 2, 3, and 5. The global storage space needed is equal to the sum of the output sizes for stage 2, 3 and 5, which belong to Group III.

The heuristic method is generalizable for any of a variety of graph-cut problems. As we are usually considering the trade-off between two aspects, by replacing the variables "temp data usage" and "time-to-live" described with reference to FIG. 9, the heuristic method can be applicable for many objective functions. For instance, for the graph cut problem, if the objective is to maximize the expected time saving for the recovery mechanism considering the probabilities of stage failures, the trade-off becomes the following:

(1) If selecting a cut that is closer to the starting of the job and having a small number of stages on the side of P, the potential saving for restart time is short because the runtime for only a small number of stages is saved.

(2) If selecting a cut that is closer to the end of the jobs and having a small number of stages on the side of Q, the potential saving also is small because the probability of having a stage on side Q to fail is also small. Therefore, the corresponding expected saving is small.

In this sense, we can replace the variables "temp data usage" and "time-to-live" with the probability of failures for any stages on side Q but not P and the potential time saving if restarting.

Let $\delta$ denote the failure rate for a vertex. The probability of failure for stage u with vu vertices can be approximated by:

$$1-(1-\delta)^{v_u} \approx \delta v_u. \quad (17)$$

As described above with reference to FIG. 8, the probability of a job failing in one of the stages on the side after the cut but not before the cut is:

$$P = \prod_{u \in S}(1 - \delta v_u)^{z_u}\left(1 - \prod_{u' \in S}(1 - \delta v_{u'})^{1-z_{u'}}\right). \quad (18)$$

Figure 10:
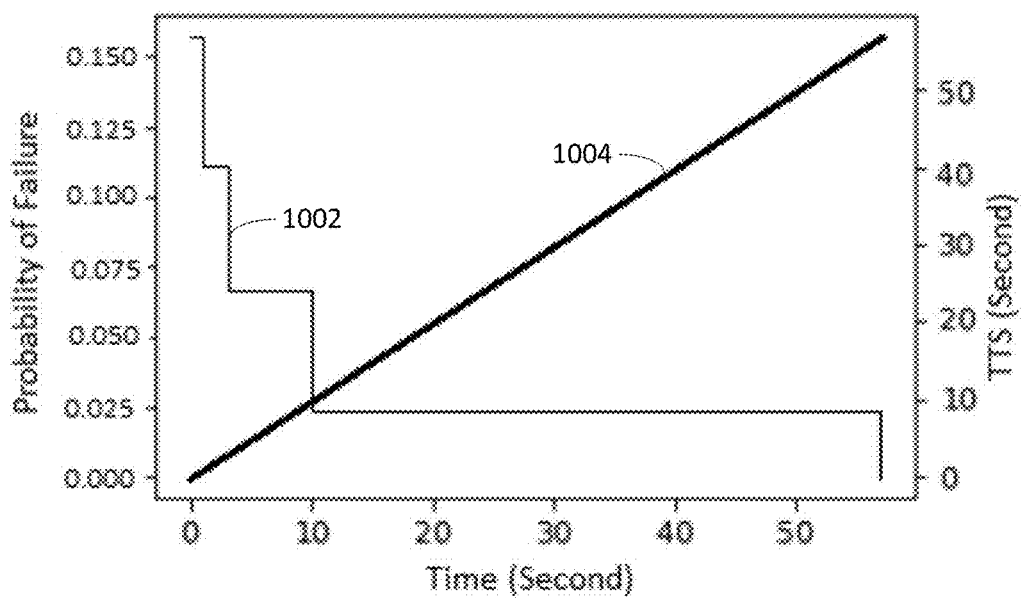
FIG. 10 shows plots of the changes of probability of failing after a stage and the corresponding recovery time saving in accordance with an embodiment.

FIG. 10 shows plots 1002 and 1004 of the changes of probability of failing after a stage and the corresponding recovery time saving, respectively, in accordance with an embodiment. The recovery time saving is estimated based on the time from start (TTS) for the corresponding checkpoint stages, as a function of time, assuming $\delta=0.01$.

The cost of using global storage is not incorporated in the solution discussed above. It can be incorporated in the step of selecting jobs for checkpoints. With a relatively high number (e.g., half a million) jobs being executed every day and a limited capacity for the global storage, it may be possible to checkpoint only a fraction of those jobs. It may therefore be desirable to strategically select those jobs to maximize the objective function (e.g., total temp data saving and/or recovery time saving) subject to the capacity constraint for the global storage. Based on the estimation for the potential saving for the temp data storage and the space needed for global storage for each job, we can be more selective about which job to execute the flushing.

For the analyzed time period T (e.g., 1 day), assume that the maximum capacity for global storage is W. Let $w_i$ denote the global storage space needed and $\pi_i$ denote the ratio between the objective function and the global storage needed for job i. This problem can be formulated as an online stochastic knapsack problem. The performance for an online algorithm is usually measured by the competitive ratio, defined by the ratio of the total value of items in the knapsack of a given algorithm to that of the best offline algorithm with full knowledge about the item sequences. It has been proven that there is no online algorithm that achieves a non-trivial competitive ratio.

It is possible to use an Online-KP-Threshold algorithm that is both upper and lower bounded for the competitive ratio based on the range of value-to-weight ratio, $\pi$. However, in the present case, the bound is not satisfactory because the distribution for the value-to-weight ratio has a very long tail (e.g., up to multiple scales).

With the advent of reinforcement learning (RL) algorithms, deep reinforcement learning may be used to solve the combinatorial optimization problem such as the Travel Salesman Problem (TSP) and the knapsack problem.

Based on known joined distribution for the value and weights, a Markov Dynamic Programming (MDP) may be used to solve the online stochastic knapsack problem, and the optimal policy of selecting the items is based on a threshold as a function of time and the corresponding value and weight for each item. However, the policy requires solving a partial differential equation and known distributions for the value and weights. In the present case, the decision is made based on the estimated value and weight because the value and weight for each item is unknown at the compiling time. Therefore, assumptions regarding the MDP may not hold and may bias the result.

A threshold algorithm that takes into account the arrival rate of jobs and the distributions for the weights and value-to-weight ratio based on the model estimation may be used. The intuition behind this algorithm is the desire to select the items that are most "cost-effective" and, ideally, an optimal policy will select the items with high values of $\pi$. With higher job arrival rates, the probability of selecting each job is further reduced.

It can be assumed that if an item with estimated weight wi arrives with estimated value-to-weight ratio of $\pi_i$ at time t, when the remaining resource capacity n(t) is larger or equal to its weight $w_i$ and its value-to-weight ratio is larger than the predefined threshold, $\pi^*$, the item is accepted; otherwise, the item is rejected. That is, $$D(w_i, \pi_i, n(t)) = \begin{cases} 1 & \text{if } \pi_i \geq \pi^* \text{ and } n(t) \geq w_i, \\ 0 & \text{otherwise.} \end{cases} \quad (19)$$

where, $D^*w_i$, $\pi_i$, n(t) is the binary decision variable to accept/reject an item i.

Figure 11:
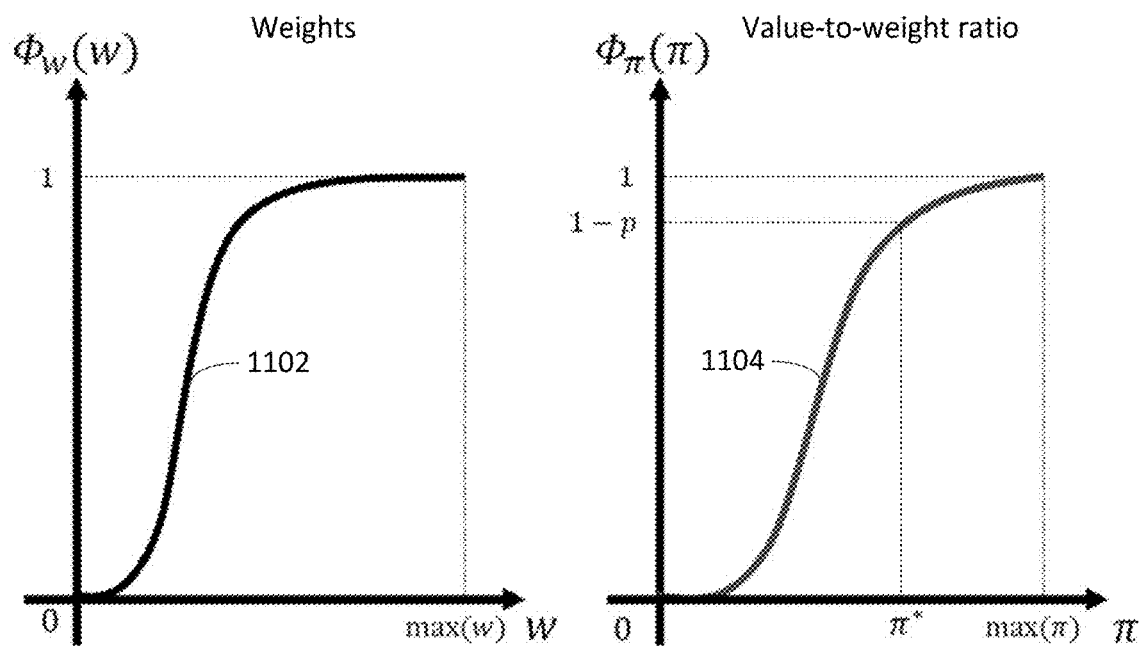
FIG. 11 shows the distributions for the weights and the value-to-weight ratio of the items in accordance with an embodiment.

This policy may ensure that in the set of accepted items, their average estimated value-to-weight ratio is larger than $\pi^*$. FIG. 11 shows the distributions 1102 and 1104 for the weights and the value-to-weight ratio of the items, respectively, in accordance with an embodiment. FIG. 11 further shows the threshold for value-to-weight ratio $\pi^*$.

Assuming that the distributions 1102 and 1104 are independent, we can define:

$$\pi^* = \Phi_\pi(1 - p), \text{ and} \quad (20)$$

$$p = \frac{W}{\lambda T \mathbb{E}_w(w)}. \quad (21)$$

where $\Phi\pi(\pi)$ is the cumulative distribution function for $\pi$, and p denotes the ratio between the total resource capacity (i.e., the total global available storage space) and the expected total weights for all the arriving items. The denominator calculates the expected total weights by taking the product of the arrival rate A and T according to Little's Law, and the expected weight for the items $E_w(w)$ assuming the weight distribution for all items are i.i.d. Without capacity constraints, one can show that this threshold of π* results in the expected total weights for the selected items to be equal to the total capacity. Note that as p is calculated off-line, it can be calibrated with the "true" distribution of weights from historic data. On the contrary, the threshold value should be calculated based on the estimated distribution of π because the threshold is being compared with the estimated πi for each item.

The integer programming (IP) formulation for the checkpoint optimization can be extended for the cases with multiple cuts. Let $z_u^{(c)}$ denote the binary decision variable indicating whether stage u is before the cut $c \in C=\{0, 1, \ldots, K\}$, $K \geq 1$. Let $d_{uv}^{(c)}$ denote whether edge (u,v) is on the cut c. The optimization problem for multiple cuts can be formulated as follows:

$$\max_{\substack{z_u^{(c)}, \forall u \in S, c \in C \\ d_{uv}^{(c)}, \forall (u,v) \in E, c \in C}} Obj(z_u^{(c)}, d_{uv}^{(c)}) \quad (22)$$

$$\text{s.t. } G = \sum_{u \in S} o_u g_u, \quad (23)$$

$$g_u \geq d_{uv}^{(c)}, \forall (u, v) \in E, \forall c \in \{1, \cdots, K\}, \forall u \quad (24)$$

$$z_u^{(c-1)} \leq z_u^{(c)}, \forall c \in \{1, \cdots, K\} \quad (25)$$

$$d_{uv}^{(c)} - z_u^{(c)} + z_v^{(c)} \geq 0, \forall (u, v) \in E, \forall c \in C, \quad (26)$$

$$\sum_{c \in C} d_{uv}^{(c)} \leq 1 \ \forall (u, v) \in E \quad (27)$$

$$d_{uv}^{(c)} \in \{0, 1\}, \forall (u, v) \in E, \forall c \in C, \quad (28)$$

$$z_u^{(c)} \in \{0, 1\}, \forall u \in S, \forall c \in C. \quad (29)$$

The total number of decision variables is $(K+1) \cdot (|S|+|E|)$, and the number of possible combinations is $2^{(K+1) \cdot (|S|+|E|)}$. Constraint (24) is similar to Constraint (3) and requires that the objective function aims to minimize G. Constraint (25) ensures that the cut c−1 comes "before" the cut c and that all the stages before the cut c−1 will also be before the cut c. Constraint (26) is similar to a constraint in the single cut formulation. Constraint (27) ensures that the cuts do not overlap.

The heuristic method for selecting the checkpoint stages is simpler, faster but not as flexible as the IP solution in terms of adding constraints or considering multiple cuts. The heuristic method does not require solvers for the optimization formulation, but it involves sorting as a pre-processing step and uses brute-force to search for the optimal set of global checkpoints. Because it uses brute-force to enumerate over all feasible solutions, the computation cost to add the consideration for the global storage constraint is large because, for each possible time stamp, the global data size is computed by examining the full computation graph based on the proposed cut. Therefore, the capacity constraint for the global storage may be incorporated in a separate step. The IP solution is more flexible because it takes into account the cost for global data storage and is applicable for the cases with multiple cuts.

The modules introduced in this work can also be replaced or removed depending on the performance requirement. For instance, the ML predictor for TTL can be removed because the optimizer can use the estimated TTL from the job runtime simulator directly. For a relatively low performance requirement, the optimizer can use some basic "prediction" for the stage costs (e.g., assuming a constant output size and runtime for each stage and simply make decisions based on the query execution graph and the outputs of the job runtime simulator). In this sense, the cuts may be selected primarily based on the count of stages. The architecture of the ML logic may be quite flexible.

Some experiment results for the data-driven checkpoint selector with back-testing based on production workloads will now be discussed. To improve on the coverage of the data-driven checkpoint selector for the jobs, some pre-processing steps may be performed. A first pre-processing step pertains to internal stages. Throughout the job execution, many internal stages are inserted. However, this information is unknown at the compile time. Therefore, in the training process, those stages may be deleted to avoid selecting them as checkpoints. In order to preserve the correct dependency between stages, the execution graph may be modified in the training/testing process by: (1) deleting stages with "internal" or "database" in the stage name and (2) adding edges for each pair of the upstream stage and downstream stage of this internal stage sequentially. The modified execution graph then may be used for the downstream modules.

A second pre-processing step pertains to missing stage statistics. The average estimated stage runtime and output size for the other stages of the same job may be used to impute the missing predictions due to data quality issues. For the purpose of model evaluation in the back-testing as well as the training for the TTL predictor, the true TTL may be required. For a particular job with stages that have missing values for TTL, a piece-wise linear interpolation may be trained based on the estimated TTL from the job runtime simulator and the known TTL values from other stages for the imputation.

The prediction accuracy for both the LightGbm and DNN models were evaluated as previously described herein. The general DNN models for both the execution time and output size were developed by training with 5-day's data (with 13.0 million samples) and testing on 1-day's data (with 2.9 million samples). The DNN model incorporated the Norm Input name as a text feature and therefore included more information about the stage/job. The $R^2$ values for the DNN models were 0.84 and 0.89 for the execution time and output size prediction, respectively. In general, machine learning algorithms often require normalization of the data to avoid scale issues. However, the scale of the input features and the target values varies significantly. For instance, with large variances in job characteristics, the output size of a stage can range from a few bytes to multiple gigabytes. We therefore used log-scales for the features and the target value in the training process.

Figure 12:
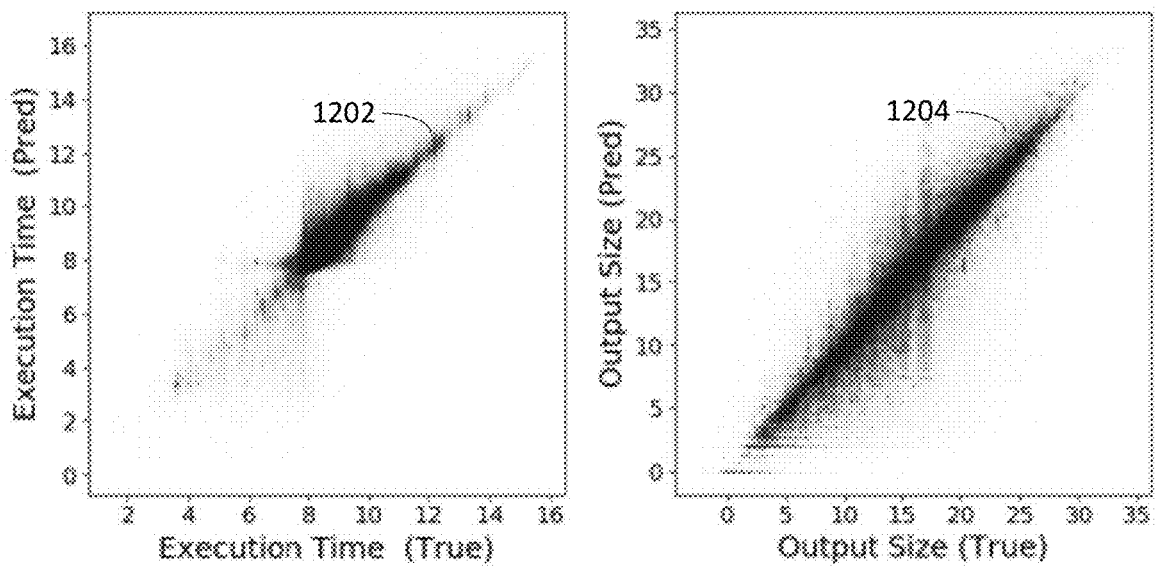
FIG. 12 depicts scatter plots 1202 and 1204 that show the prediction accuracy for the stage-type specific models in accordance with an embodiment.

Similarly, we developed the general and stage-type specific LightGbm models using the same data. The performance for the general model was not as good as the stage-type specific model. FIG. 12 depicts scatter plots 1202 and 1204 that show the prediction accuracy for the stage-type specific models in accordance with an embodiment. There were 33 stage types; thus, in total we had 33 models for predicting the execution time and 33 models for the output size. The $R^2$ values for the LightGbm models are 0.85 and 0.91 for the execution time and output size prediction, respectively.

Figure 13:
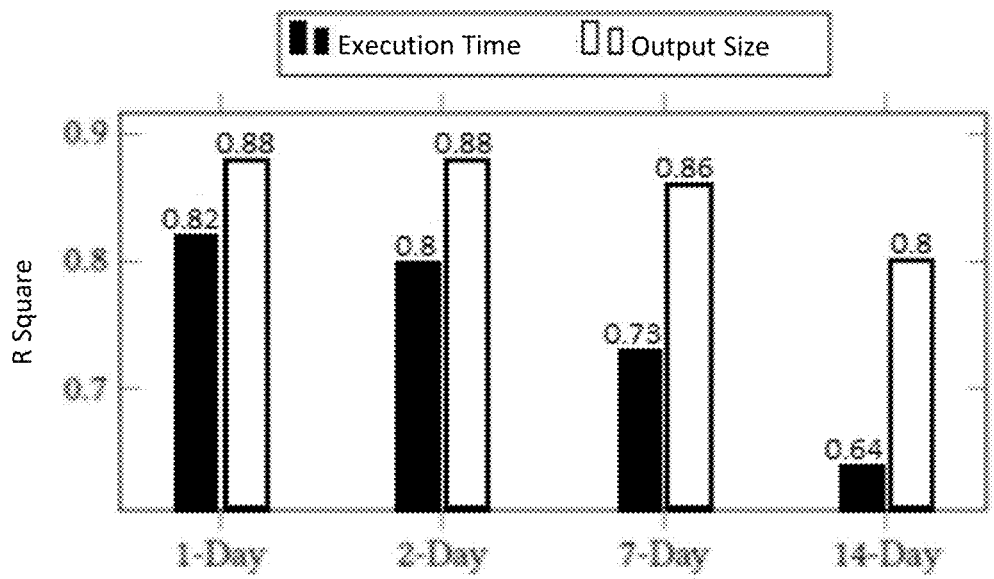
FIG. 13 is a bar chart 1300 that shows performance accuracy of the trained model on test days at various periods of time from a training period in accordance with an embodiment.

The generalization of the trained model to future days was also measured to determine the frequency needed to retrain the ML models. In production, the frequency for retraining and deploying new models is determined to keep up with the changes in the data distribution. FIG. 13 is a bar chart 1300 that shows performance accuracy of the trained model on test days at various periods of time from a training period (e.g. 1 day after, 2 days after, etc.) in accordance with an embodiment. As shown in FIG. 13, the model generalizes well for data that was extracted 1 or 2 days prior to the test day, and the accuracy decreases gradually thereafter as the time period between the training period and the test day increases.

The training time for the DNN model is substantially longer than the training time for the LightGbm models. Each (general) DNN model takes over 40 hours with a standard virtual machine with 6 Cores, 56 GB RAM, and a NVIDIA Tesla K80 GPU. It is partially due to the large size of the training data and the introduction of the LSTM layer for the featurization of the text features. One potential improvement is to replace it with attention layers such as transformers to allow better parallelization with the GPU.

Compared with the general DNN models, the stage-type specific model based on LightGbm is slightly more accurate, and the training time is much shorter, which is in the scale of minutes. In the following discussion of temp data saving, the prediction results from LightGbm are used as the input to the optimizer.

Using historic data where the true output size and the execution schedule for each stage are known, we evaluated the checkpoint algorithm using back-testing to see how well the algorithm would have done ex-post by evaluating the temp data savings.

Figure 14:
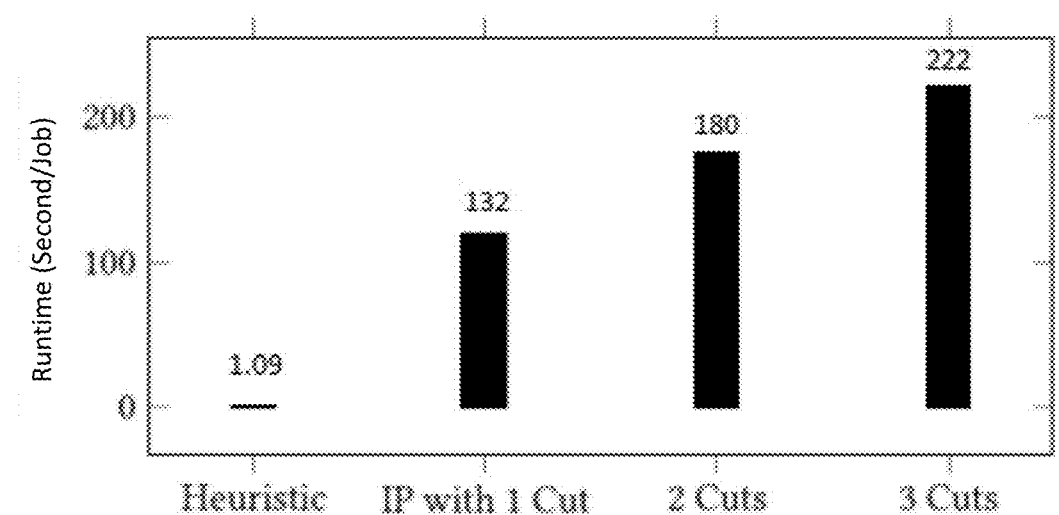
FIG. 14 is a bar chart 1400 that shows average runtime per job based on checkpoint selection using various numbers of cuts in accordance with an embodiment.

The Integer Programming (IP) solution is more general because it accounts for the cases with multiple cuts and different costs for the global storage. However, the processing time of using solvers is longer than the implementation for the heuristic solution to select the optimal checkpoint time. FIG. 14 is a bar chart 1400 that shows average runtime per job based on checkpoint selection using various numbers of cuts in accordance with an embodiment. The IP formulation was used to test the sensitivity of the temp data saving with respect to the different numbers of cuts as well as the cost for global data storage.

Figure 15:
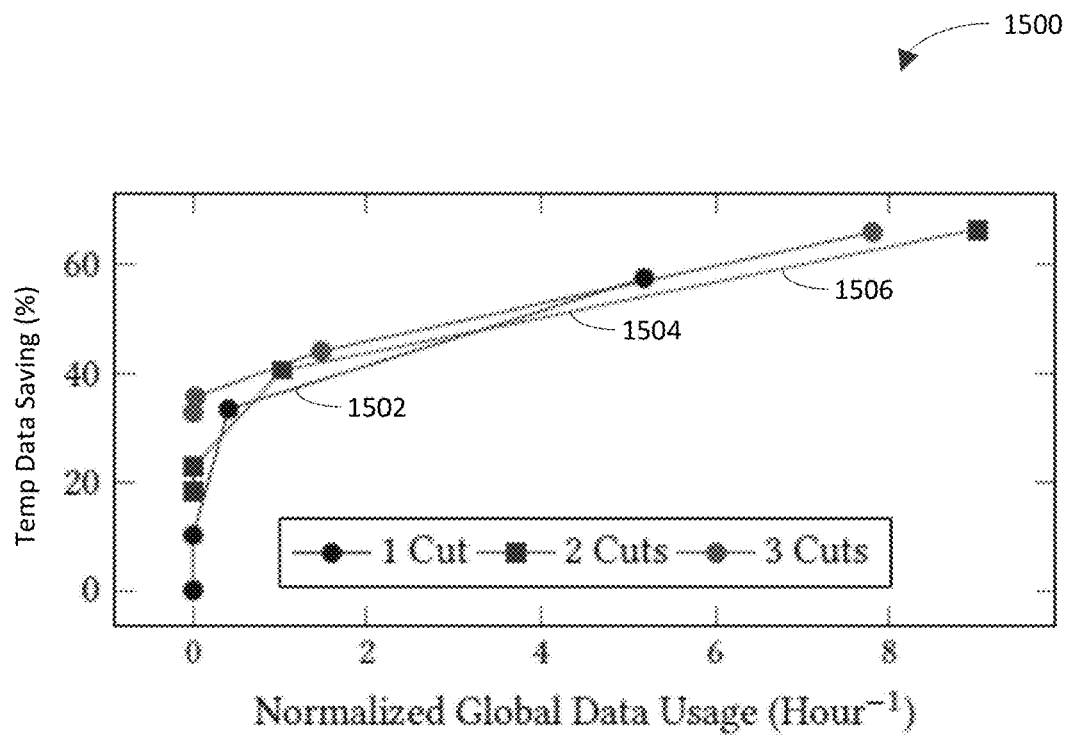
FIG. 15 is a plot that includes curves showing a percentage of temp data saving for respective numbers of cuts in accordance with an embodiment.

Based on this testing, adding a second or third cut may not be cost-efficient. FIG. 15 is a plot 1500 that includes curves 1502, 1504, and 1506 showing a percentage of temp data saving for respective numbers of cuts in accordance with an embodiment. The plot 1500 shows the Pareto frontier for the problem. The x-axis shows the median usage for the global data space normalized by the total original temp data usage across all jobs. The y-axis shows the median temp data saving also normalized by the original temp data usage. We can see that with small global storage capacity, adding more cuts improves on the temp data saving. However, when allowing a larger global data usage, the differences are less significant. Even though adding cuts improves the saving for the temp data storage, it also tends to checkpoint more stages, which increases the need for global storage space.

There is a small portion of the jobs that have "free" cuts, meaning that they require no global storage space. Those are jobs with sub-graphs that are independent of each other. Because there is not dependency between the two sub-graphs, there is no need to checkpoint files for the stages. Using the IP solution, those cuts were automatically selected.

The proposed heuristic solution by searching for the optimal checkpoint time is faster compared to using the solvers for the IP solution, as shown in FIG. 14.

Figure 16:
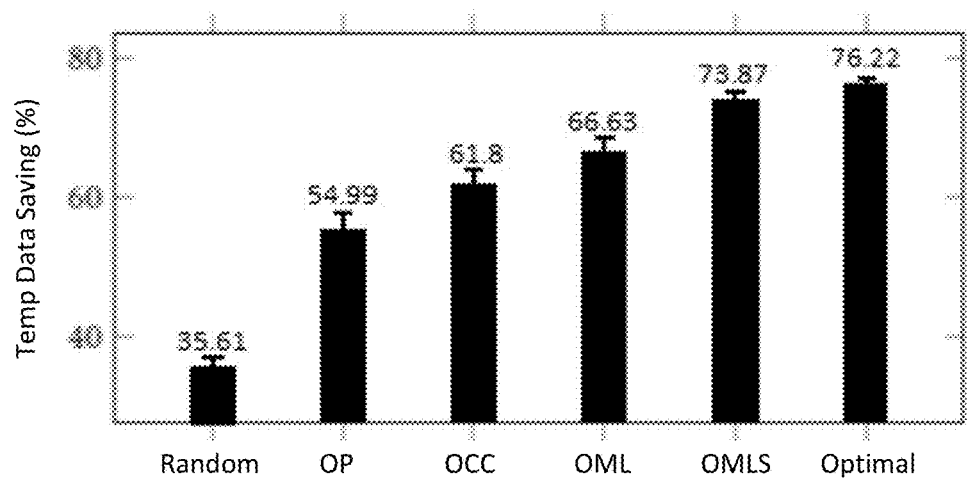
FIG. 16 is a bar chart 1600 that shows the daily average percentage of temp data saving for various techniques in accordance with an embodiment.

FIG. 16 is a bar chart 1600 that shows the daily average percentage of temp data saving for various techniques in accordance with an embodiment. The techniques include (1) random, (2) optimizer+platform cost, (3) optimizer+constant cost, (4) optimizer+ML cost models, (5) optimizer+ML cost models+stacking models, and (6) optimal. The daily average percentage of temp data saving for each technique is based on 6-day's observations for one cluster with approximately 405,000 jobs in total. The error bar shows the standard deviation. The "random" technique (Random) used a random checkpoint selector that randomly selected stages as the global checkpoint. The "optimizer+platform cost" technique (OP) used the estimated cost from the query optimizer for the output size and execution time for each stage as the inputs to the job runtime simulator and the proposed optimizer. The "optimizer+constant cost" technique (OCC) is similar to the OP technique, assuming a simple constant for the output size and execution time for each stage. The "optimizer+ML cost models" technique (OML) used the proposed optimizer using ML predictions as inputs and using the estimated TTL from the job runtime simulator. The "optimizer+ML cost models+stacking models" technique (OMLS) used the proposed optimizer using the estimated TTL from the stacking model. The "optimal" technique (Optimal) used the optimal off-line checkpoint optimizer based on the knowledge of the true output size and time-to-live (TTL) for all stages.

Using the estimated stage scheduling and the costs to determine the checkpoints significantly increases the saving on the temp data storage. As shown in FIG. 16, the random optimizer can save on average 36% of temp data storage, measured by the portion of temp data storage that can be cleared in the unit of Petabytes*Hour (PB*Hour). Adding the optimizer and the estimation for the stage scheduling almost doubles the saving. By further improving the estimation on the output size, the proposed optimizer without the stacking model can save on average 67% of the temp data storage; and with the stacking model, the percentage further increases to 74%. The optimal off-line optimizer can save 76%. Although it may seem that using the estimated cost from the optimizer (Platform Cost) would be able to improve the performance compared to using the constant cost, the corresponding temp data saving is actually worse due to the large errors for the cost estimation from the optimizer. If the output size is wrongly estimated by a large margin, this might mislead the optimizer to wrongly select the checkpoints. This demonstrates the importance of having cost models.

Figure 17:
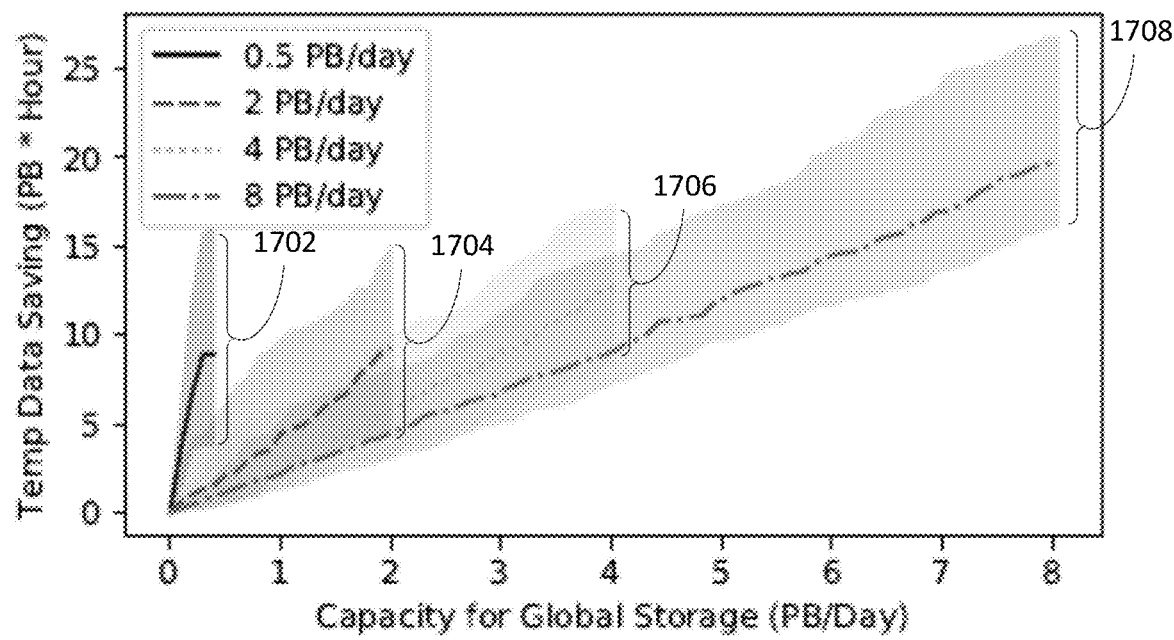
FIG. 17 shows plots of the temp data saving with respect to the cumulative usage for the global data storage, including the $5^{th}$ and $95^{th}$ confidence level on the saving, under various capacity constraints for the global storage in accordance with an embodiment.

FIG. 17 shows plots 1702, 1704, 1706, and 1708 of the temp data saving with respect to the cumulative usage for the global data storage, including the $5^{th}$ and $95^{th}$ confidence level on the saving, under various capacity constraints for the global storage in accordance with an embodiment. As shown in FIG. 17, with a larger capacity for the global data storage, the total temp data saving increases. However, because we are less selective about the jobs, the average value-to-weight ratio for the selected pool of jobs and the slope for the curve decreases. Therefore, to determine the best size of the capacity limit for the global storage, we should take into account the corresponding costs for the two types of storage and determine the optimal value.

As mentioned previously, the proposed method can be extended to other applications with different objectives. The following discussion presents the experiment results for the heuristic method for maximizing the recovery time saving.

Testing on 1-day's data with approximately 62,000 jobs, we evaluated four algorithms to select the optimal checkpoints. The algorithms include Random, Mid-point, Improved, and Optimal. The Random algorithm uses a random checkpoint selector that randomly selects stages as the global checkpoints. The Mid-point algorithm uses the estimated stage scheduling from the job runtime simulator and cuts the execution graph into two based on the mid-point of the total job execution time. The Improved algorithm uses the proposed method using the model prediction for the stage scheduling and the estimated probability of failures for each stage. The Optimal algorithm uses the optimal off-line checkpoint optimizer based on the knowledge of the stage scheduling and failure probabilities for all stages.

Figure 18:
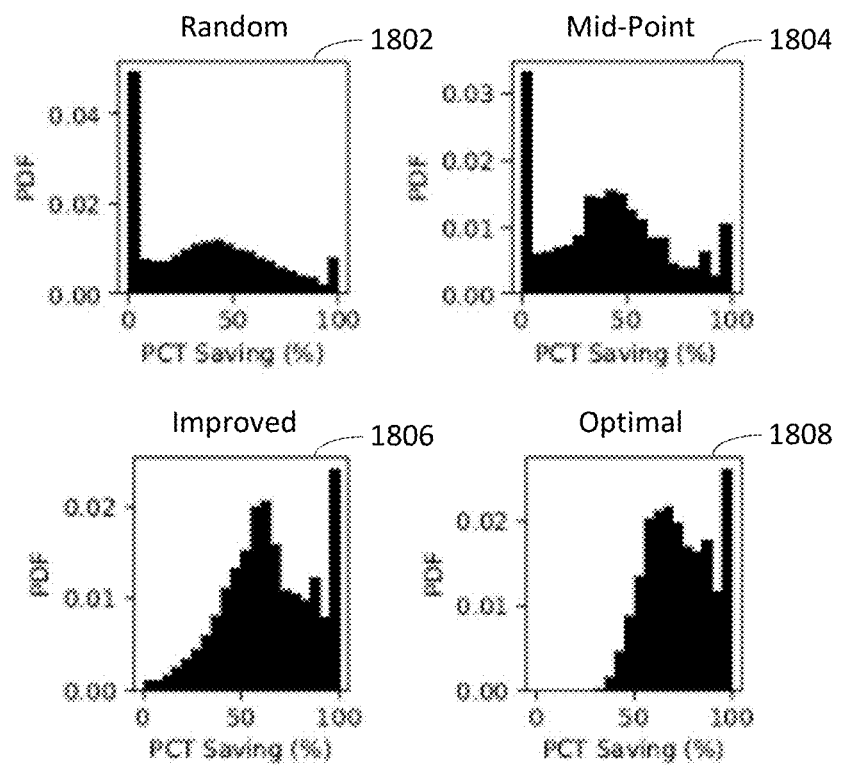
FIG. 18 depicts bar graphs that show distribution of the percentage of recovery time saving at the job level for the respective algorithms in accordance with an embodiment.

FIG. 18 depicts bar graphs 1802, 1804, 1806, and 1808 that show distribution of the percentage of recovery time saving at the job level for the respective Random, Mid-point, Improved, and Optimal algorithms in accordance with an embodiment. The average percentage saving for the expected recovery time is 36% for the Random algorithm, 41% for the Mid-Point algorithm, 64% for the Improved algorithm, and 73% for the Optimal algorithm. It can be seen that by introducing the predictions on stage scheduling and the estimated failure probabilities, the recovery time saving improves. However, more work can be done to further improve on the estimation accuracy for the TTS.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the data-driven checkpoint selector 112, the data-driven checkpoint selector 412, the compiler 422, the temporal logic 424, the prediction logic 426, the candidate identifier 428, the checkpoint logic 430, the storage logic 432, the data-driven checkpoint selector 602, the workload optimization platform 604, the stage execution time predictor 606, the stage output size predictor 608, the TTL estimator 610, the checkpoint optimizer 612, the job runtime simulator 614, the time-to-live predictor 616, the workload insights service 618, the query compiler 620, the query optimizer 622, the job scheduler 624, the job manager 626, flowchart 200, and/or flowchart 300 may be implemented in hardware, software, firmware, or any combination thereof.

For example, any one or more of the data-driven checkpoint selector 112, the data-driven checkpoint selector 412, the compiler 422, the temporal logic 424, the prediction logic 426, the candidate identifier 428, the checkpoint logic 430, the storage logic 432, the data-driven checkpoint selector 602, the workload optimization platform 604, the stage execution time predictor 606, the stage output size predictor 608, the TTL estimator 610, the checkpoint optimizer 612, the job runtime simulator 614, the time-to-live predictor 616, the workload insights service 618, the query compiler 620, the query optimizer 622, the job scheduler 624, the job manager 626, flowchart 200, and/or flowchart 300 may be implemented, at least in part, as computer program code configured to be executed in one or more processors.

In another example, any one or more of the data-driven checkpoint selector 112, the data-driven checkpoint selector 412, the compiler 422, the temporal logic 424, the prediction logic 426, the candidate identifier 428, the checkpoint logic 430, the storage logic 432, the data-driven checkpoint selector 602, the workload optimization platform 604, the stage execution time predictor 606, the stage output size predictor 608, the TTL estimator 610, the checkpoint optimizer 612, the job runtime simulator 614, the time-to-live predictor 616, the workload insights service 618, the query compiler 620, the query optimizer 622, the job scheduler 624, the job manager 626, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to select checkpoints of a recurrent database job comprises a memory and one or more processors coupled to the memory. The one or more processors are configured to determine, at compile time of database queries that define the recurrent database job, temporal indicators associated with query plans that result from compilation of the respective database queries such that one or more temporal indicators are associated with each query plan. Each of the one or more temporal indicators associated with each query plan indicates a first subset of a plurality of stages of the respective query plan that are to have executed by a respective reference time indicated by the respective temporal indicator and a second subset of the plurality of stages of the respective query plan that are not to have executed by the respective reference time. Each stage includes a plurality of threads. The one or more processors are further configured to predict a plurality of values of a plurality of respective attributes of each stage in at least the first subset of the plurality of stages of each query plan indicated by a first temporal indicator associated with the respective query plan by analyzing a plurality of historical values of the plurality of attributes of the respective stage for each of a plurality of historical executions of the respective stage using a machine learning technique. The one or more processors are further configured to identify, at the compile time of the database queries, one or more candidate stages for each query plan from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan. The one or more processors are further configured to selectively choose the one or more candidate stages for each query plan that correspond to the first temporal indicator associated with the respective query plan to be one or more respective checkpoints of the recurrent database job based on whether the plurality of values of the plurality of respective attributes of each stage in at least the first subset of the plurality of stages of the respective query plan indicated by the first temporal indicator associated with the respective query plan satisfy one or more criteria.

In a first aspect of the example system, the one or more processors are configured to predict an output size of an output file of each stage in at least the first subset of the plurality of stages of each query plan indicated by the first temporal indicator associated with the respective query plan based on features correlated to the respective output size. In accordance with the first aspect, the one or more processors are configured to predict a time-to-live of each stage in at least the first subset of the plurality of stages of each query plan indicated by the first temporal indicator associated with the respective query plan based on features correlated to the respective time-to-live. In accordance with the first aspect, the one or more processors are configured to selectively choose the one or more candidate stages for each query plan that correspond to the first temporal indicator associated with the respective query plan to be one or more respective checkpoints of the recurrent database job based on whether a combination of one or more output sizes of one or more respective output files of the one or more respective candidate stages of the respective query plan that correspond to the first temporal indicator associated with the respective query plan and one or more times-to-live of the one or more respective candidate stages of the respective query plan that correspond to the first temporal indicator associated with the respective query plan satisfies the one or more criteria.

In a first implementation of the first aspect, the one or more processors are configured to selectively choose the one or more candidate stages for a designated query plan that correspond to the first temporal indicator associated with the respective query plan to be one or more respective designated checkpoints of the recurrent database job by weighing (A) a benefit of deleting an intermediate output file of each stage in the first subset of the plurality of stages of the designated query plan indicated by the first temporal indicator associated with the respective query plan from a local store of a database against which the recurrent database job is executed against (B) a cost of storing an intermediate output file of each designated checkpoint in a global data store of the database.

In a second implementation of the first aspect, the one or more processors are configured to choose the one or more candidate stages for a designated query plan that correspond to the first temporal indicator associated with the respective query plan to be one or more respective designated checkpoints of the recurrent database job. In accordance with the second implementation, the one or more processors are configured to store an intermediate output file of each designated checkpoint in a global data store of a database against which the recurrent database job is executed. In further accordance with the second implementation, the one or more processors are configured to delete an intermediate output file of each stage in the first subset of the plurality of stages of the designated query plan indicated by the first temporal indicator associated with the respective query plan from a local store of the database.

In a third implementation of the first aspect, the one or more processors are configured to predict each of one or more times-to-live of the one or more respective candidate stages for each query plan that correspond to the first temporal indicator associated with the respective query plan based on a factor that is equal to a difference between an estimate of a total processing time of the recurrent database job and a temporally last end time of one or more end times of the one or more candidate stages for the respective query plan that correspond to the first temporal indicator associated with the respective query plan.

In a first example of the third implementation, the one or more processors are configured to predict a start time of each stage in a dependency chain of each candidate stage to be a temporally last end time of child stages of the respective stage.

In a second example of the third implementation, the one or more processors are configured to selectively choose the one or more candidate stages for each query plan that correspond to the first temporal indicator associated with the respective query plan to be one or more respective checkpoints of the recurrent database job based on whether a product of (A) a sum of the one or more output sizes of the one or more respective output files of the one or more respective candidate stages of the respective query plan that correspond to the first temporal indicator associated with the respective query plan and (B) a least time-to-live of the one or more times-to-live of the one or more respective candidate stages of the respective query plan that correspond to the first temporal indicator associated with the respective query plan is greater than or equal to a threshold value.

In a second aspect of the example system, the one or more processors are configured to predict a probability that a stage in the second subset of the plurality of stages of each query plan indicated by the first temporal indicator associated with the respective query plan is to fail based on a number of threads in the respective stage, a historic probability of each thread in the respective stage to fail, and a proportion of the stages in the respective query plan in each of the first subset and the second subset of the respective stages. In accordance with the second aspect, the one or more processors are configured to predict an amount of time to be saved during a recovery of the recurrent database job as a result of choosing the one or more candidate stages for each query plan that correspond to the first temporal indicator associated with the respective query plan to be one or more respective checkpoints of the recurrent database job. In further accordance with the second aspect, the one or more processors are configured to selectively choose the one or more candidate stages for each query plan that correspond to the first temporal indicator associated with the respective query plan to be one or more respective checkpoints of the recurrent database job based on whether a combination of the probability that a stage in the second subset of the plurality of stages of the respective query plan indicated by the first temporal indicator associated with the respective query plan is to fail and the amount of time to be saved during the recovery of the recurrent database job as a result of choosing the one or more candidate stages to be one or more respective checkpoints of the recurrent database job satisfies the one or more criteria. The second aspect of the example system may be implemented in combination with the first aspect of the example system, though the example embodiments are not limited in this respect.

In a first implementation of the second aspect, the one or more processors are configured to selectively choose the one or more candidate stages for a designated query plan that correspond to the first temporal indicator associated with the respective query plan to be one or more respective designated checkpoints of the recurrent database job by weighing (A) a benefit of increasing the amount of time to be saved during a recovery of the recurrent database job based on a product of (1) the probability that a stage in the second subset of the plurality of stages of the respective query plan indicted by the first temporal indicator associated with the respective query plan is to fail and (2) the amount of time to be saved during the recovery of the recurrent database job as a result of choosing the one or more candidate stages to be one or more respective checkpoints of the recurrent database job against (B) a cost of storing an intermediate output file of each designated checkpoint in a global data store of the database.

In a second implementation of the second aspect, the one or more processors are configured to predict the amount of time to be saved during a recovery of the recurrent database job as a result of choosing the one or more candidate stages for a designated query plan that correspond to the first temporal indicator associated with the respective query plan to be one or more respective designated checkpoints of the recurrent database job to be equal to an amount of time from a start of the recurrent database job until a temporally last starting time of one or more starting times of the one or more respective candidate stages of the designated query plan.

In an example of the second implementation, the one or more processors are configured to predict a start time of each stage in a dependency chain of each candidate stage of the designated query plan to be same as a temporally last end time of child stages of the respective stage.

In a third implementation of the second aspect, the one or more processors are configured to selectively choose the one or more candidate stages for each query plan that correspond to the first temporal indicator associated with the respective query plan to be one or more respective checkpoints of the recurrent database job based on whether a product of (1) a probability that a stage in the first subset of the plurality of stages of the respective query plan indicted by the first temporal indicator associated with the respective query plan is to succeed, (2) the probability that a stage in the second subset of the plurality of stages of the respective query plan indicated by the first temporal indicator associated with the respective query plan is to fail, and (3) the amount of time to be saved during the recovery of the recurrent database job as a result of choosing the one or more candidate stages to be one or more respective checkpoints of the recurrent database job is greater than or equal to a threshold value.

In a third aspect of the example system, each query plan is associated with a plurality of temporal indicators that include a first respective temporal indicator and a second respective temporal indicator. In accordance with the third aspect, the one or more processors are configured to predict a second plurality of values of a plurality of respective attributes of each stage in at least the first subset of the plurality of stages of each query plan indicated by the second temporal indicator associated with the respective query plan by analyzing a second plurality of historical values of the plurality of attributes of the respective stage for each of a second plurality of historical executions of the respective stage using the machine learning technique. In further accordance with the third aspect, the one or more processors are configured to identify, at the compile time of the database queries, one or more second candidate stages for each query plan from the first subset of the plurality of stages of the respective query plan indicated by the second temporal indicator associated with the respective query plan based on each candidate stage being a child of one or more stages in the second subset of the plurality of stages of the respective query plan indicated by the second temporal indicator associated with the respective query plan or not being a child of another stage in the respective query plan. In further accordance with the third aspect, the one or more processors are configured to selectively choose the one or more second candidate stages for each query plan that correspond to the second temporal indicator associated with the respective query plan to be one or more respective second checkpoints of the recurrent database job based on whether the second plurality of values of the plurality of respective attributes of each stage in at least the first subset of the plurality of stages of each query plan indicated by the second temporal indicator associated with the respective query plan satisfy one or more second criteria. The third aspect of the example system may be implemented in combination with the first and/or second aspect of the example system, though the example embodiments are not limited in this respect.

In an implementation of the third aspect, the one or more processors are configured to use integer programming to selectively choose the one or more candidate stages for each query plan that correspond to the first temporal indicator associated with the respective query plan to be one or more respective checkpoints of the recurrent database job and to selectively choose the one or more second candidate stages for each query plan that correspond to the second temporal indicator associated with the respective query plan to be one or more respective second checkpoints of the recurrent database job.

In a fourth aspect of the example system, the one or more processors are configured to categorize the stages of the query plans among a plurality of stage types based on the stages of each stage type being configured to perform a respective common subset of operations. In accordance with the fourth aspect, the one or more processors are configured to predict the plurality of values of the plurality of respective attributes of each stage in at least the first subset of the plurality of stages of each query plan indicated by the first temporal indicator associated with the respective query plan using a plurality of machine learning techniques on the stages that are categorized among the plurality of respective stage types. The fourth aspect of the example system may be implemented in combination with the first, second, and/or third aspect of the example system, though the example embodiments are not limited in this respect.

In an example method of selecting checkpoints of a recurrent database job, at compile time of database queries that define the recurrent database job, temporal indicators associated with query plans that result from compilation of the respective database queries are determined such that one or more temporal indicators are associated with each query plan. Each of the one or more temporal indicators associated with each query plan indicates a first subset of a plurality of stages of the respective query plan that are to have executed by a respective reference time indicated by the respective temporal indicator and a second subset of the plurality of stages of the respective query plan that are not to have executed by the respective reference time. Each stage includes a plurality of threads. A plurality of values of a plurality of respective attributes of each stage in at least the first subset of the plurality of stages of each query plan indicated by a first temporal indicator associated with the respective query plan are predicted by analyzing a plurality of historical values of the plurality of attributes of the respective stage for each of a plurality of historical executions of the respective stage using a machine learning technique. At the compile time of the database queries, one or more candidate stages for each query plan are identified from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan. The one or more candidate stages for each query plan that correspond to the first temporal indicator associated with the respective query plan are selectively chosen to be one or more respective checkpoints of the recurrent database job based on whether the plurality of values of the plurality of respective attributes of each stage in at least the first subset of the plurality of stages of the respective query plan indicated by the first temporal indicator associated with the respective query plan satisfy one or more criteria.

In a first aspect of the example method, predicting the plurality of values of the plurality of respective attributes of each stage in at least the first subset of the plurality of stages of each query plan indicated by the first temporal indicator associated with the respective query plan comprises predicting an output size of an output file of each stage in at least the first subset of the plurality of stages of each query plan indicated by the first temporal indicator associated with the respective query plan based on features correlated to the respective output size. In accordance with the first aspect, predicting the plurality of values of the plurality of respective attributes of each stage in at least the first subset of the plurality of stages of each query plan indicated by the first temporal indicator associated with the respective query plan further comprises predicting a time-to-live of each stage in at least the first subset of the plurality of stages of each query plan indicated by the first temporal indicator associated with the respective query plan based on features correlated to the respective time-to-live. In further accordance with the first aspect, selectively choosing the one or more candidate stages for each query plan that correspond to the first temporal indicator associated with the respective query plan to be one or more respective checkpoints of the recurrent database job comprises selectively choosing the one or more candidate stages for each query plan that correspond to the first temporal indicator associated with the respective query plan to be one or more respective checkpoints of the recurrent database job based on whether a combination of one or more output sizes of one or more respective output files of the one or more respective candidate stages of the respective query plan that correspond to the first temporal indicator associated with the respective query plan and one or more times-to-live of the one or more respective candidate stages of the respective query plan that correspond to the first temporal indicator associated with the respective query plan satisfies the one or more criteria.

In a first implementation of the first aspect, selectively choosing the one or more candidate stages for each query plan that correspond to the first temporal indicator associated with the respective query plan to be one or more respective checkpoints of the recurrent database job comprises selectively choosing the one or more candidate stages for a designated query plan that correspond to the first temporal indicator associated with the respective query plan to be one or more respective designated checkpoints of the recurrent database job by weighing (A) a benefit of deleting an intermediate output file of each stage in the first subset of the plurality of stages of the designated query plan indicated by the first temporal indicator associated with the respective query plan from a local store of a database against which the recurrent database job is executed against (B) a cost of storing an intermediate output file of each designated checkpoint in a global data store of the database.

In a second implementation of the first aspect, selectively choosing the one or more candidate stages for each query plan that correspond to the first temporal indicator associated with the respective query plan to be one or more respective checkpoints of the recurrent database job comprises choosing the one or more candidate stages for a designated query plan that correspond to the first temporal indicator associated with the respective query plan to be one or more respective designated checkpoints of the recurrent database job. In accordance with the second implementation, the example method further comprises storing an intermediate output file of each designated checkpoint in a global data store of a database against which the recurrent database job is executed. In further accordance with the second implementation, the example method further comprises deleting an intermediate output file of each stage in the first subset of the plurality of stages of the designated query plan indicated by the first temporal indicator associated with the respective query plan from a local store of the database.

In a third implementation of the first aspect, predicting the time-to-live of each stage in at least the first subset of the plurality of stages of each query plan indicated by the first temporal indicator associated with the respective query plan comprises predicting each of one or more times-to-live of the one or more respective candidate stages for each query plan that correspond to the first temporal indicator associated with the respective query plan based on a factor that is equal to a difference between an estimate of a total processing time of the recurrent database job and a temporally last end time of one or more end times of the one or more candidate stages for the respective query plan that correspond to the first temporal indicator associated with the respective query plan.

In a first example of the third implementation, predicting each of the one or more times-to-live of the one or more respective candidate stages for each query plan that correspond to the first temporal indicator associated with the respective query plan comprises predicting a start time of each stage in a dependency chain of each candidate stage to be a temporally last end time of child stages of the respective stage.

In a second example of the third implementation, selectively choosing the one or more candidate stages for each query plan that correspond to the first temporal indicator associated with the respective query plan to be one or more respective checkpoints of the recurrent database job comprises selectively choosing the one or more candidate stages for each query plan that correspond to the first temporal indicator associated with the respective query plan to be one or more respective checkpoints of the recurrent database job based on whether a product of (A) a sum of the one or more output sizes of the one or more respective output files of the one or more respective candidate stages of the respective query plan that correspond to the first temporal indicator associated with the respective query plan and (B) a least time-to-live of the one or more times-to-live of the one or more respective candidate stages of the respective query plan that correspond to the first temporal indicator associated with the respective query plan is greater than or equal to a threshold value.

In a second aspect of the example method, predicting the plurality of values of the plurality of respective attributes of each stage in at least the first subset of the plurality of stages of each query plan indicated by the first temporal indicator associated with the respective query plan comprises predicting a probability that a stage in the second subset of the plurality of stages of each query plan indicated by the first temporal indicator associated with the respective query plan is to fail based on a number of threads in the respective stage, a historic probability of each thread in the respective stage to fail, and a proportion of the stages in the respective query plan in each of the first subset and the second subset of the respective stages. In accordance with the second aspect, predicting the plurality of values of the plurality of respective attributes of each stage in at least the first subset of the plurality of stages of each query plan indicated by the first temporal indicator associated with the respective query plan comprises predicting an amount of time to be saved during a recovery of the recurrent database job as a result of choosing the one or more candidate stages for each query plan that correspond to the first temporal indicator associated with the respective query plan to be one or more respective checkpoints of the recurrent database job. In further accordance with the second aspect, selectively choosing the one or more candidate stages for each query plan that correspond to the first temporal indicator associated with the respective query plan to be one or more respective checkpoints of the recurrent database job comprises selectively choosing the one or more candidate stages for each query plan that correspond to the first temporal indicator associated with the respective query plan to be one or more respective checkpoints of the recurrent database job based on whether a combination of the probability that a stage in the second subset of the plurality of stages of the respective query plan indicated by the first temporal indicator associated with the respective query plan is to fail and the amount of time to be saved during the recovery of the recurrent database job as a result of choosing the one or more candidate stages to be one or more respective checkpoints of the recurrent database job satisfies the one or more criteria. The second aspect of the example method may be implemented in combination with the first aspect of the example method, though the example embodiments are not limited in this respect.

In a first implementation of the second aspect, selectively choosing the one or more candidate stages for each query plan that correspond to the first temporal indicator associated with the respective query plan to be one or more respective checkpoints of the recurrent database job comprises selectively choosing the one or more candidate stages for a designated query plan that correspond to the first temporal indicator associated with the respective query plan to be one or more respective designated checkpoints of the recurrent database job by weighing (A) a benefit of increasing the amount of time to be saved during a recovery of the recurrent database job based on a product of (1) the probability that a stage in the second subset of the plurality of stages of the respective query plan indicted by the first temporal indicator associated with the respective query plan is to fail and (2) the amount of time to be saved during the recovery of the recurrent database job as a result of choosing the one or more candidate stages to be one or more respective checkpoints of the recurrent database job against (B) a cost of storing an intermediate output file of each designated checkpoint in a global data store of the database.

In a second implementation of the second aspect, predicting the amount of time to be saved during a recovery of the recurrent database job as a result of choosing the one or more candidate stages for each query plan that correspond to the first temporal indicator associated with the respective query plan to be one or more respective checkpoints of the recurrent database job comprises predicting the amount of time to be saved during a recovery of the recurrent database job as a result of choosing the one or more candidate stages for a designated query plan that correspond to the first temporal indicator associated with the respective query plan to be one or more respective designated checkpoints of the recurrent database job to be equal to an amount of time from a start of the recurrent database job until a temporally last starting time of one or more starting times of the one or more respective candidate stages of the designated query plan.

In an example of the second implementation, predicting the amount of time to be saved during a recovery of the recurrent database job as a result of choosing the one or more candidate stages for the designated query plan that correspond to the first temporal indicator associated with the respective query plan comprises predicting a start time of each stage in a dependency chain of each candidate stage of the designated query plan to be same as a temporally last end time of child stages of the respective stage.

In a third implementation of the second aspect, selectively choosing the one or more candidate stages for each query plan that correspond to the first temporal indicator associated with the respective query plan to be one or more respective checkpoints of the recurrent database job comprises selectively choosing the one or more candidate stages for each query plan that correspond to the first temporal indicator associated with the respective query plan to be one or more respective checkpoints of the recurrent database job based on whether a product of (1) a probability that a stage in the first subset of the plurality of stages of the respective query plan indicted by the first temporal indicator associated with the respective query plan is to succeed, (2) the probability that a stage in the second subset of the plurality of stages of the respective query plan indicated by the first temporal indicator associated with the respective query plan is to fail, and (3) the amount of time to be saved during the recovery of the recurrent database job as a result of choosing the one or more candidate stages to be one or more respective checkpoints of the recurrent database job is greater than or equal to a threshold value.

In a third aspect of the example method, each query plan is associated with a plurality of temporal indicators that include a first respective temporal indicator and a second respective temporal indicator. In accordance with the third aspect, the example method comprises predicting a second plurality of values of a plurality of respective attributes of each stage in at least the first subset of the plurality of stages of each query plan indicated by the second temporal indicator associated with the respective query plan by analyzing a second plurality of historical values of the plurality of attributes of the respective stage for each of a second plurality of historical executions of the respective stage using the machine learning technique. In further accordance with the third aspect, the example method comprises identifying, at the compile time of the database queries, one or more second candidate stages for each query plan from the first subset of the plurality of stages of the respective query plan indicated by the second temporal indicator associated with the respective query plan based on each candidate stage being a child of one or more stages in the second subset of the plurality of stages of the respective query plan indicated by the second temporal indicator associated with the respective query plan or not being a child of another stage in the respective query plan. In further accordance with the third aspect, the example method comprises selectively choosing the one or more second candidate stages for each query plan that correspond to the second temporal indicator associated with the respective query plan to be one or more respective second checkpoints of the recurrent database job based on whether the second plurality of values of the plurality of respective attributes of each stage in at least the first subset of the plurality of stages of each query plan indicated by the second temporal indicator associated with the respective query plan satisfy one or more second criteria. The third aspect of the example method may be implemented in combination with the first and/or second aspect of the example method, though the example embodiments are not limited in this respect.

In an implementation of the third aspect, the example method comprises using integer programming to selectively choose the one or more candidate stages for each query plan that correspond to the first temporal indicator associated with the respective query plan to be one or more respective checkpoints of the recurrent database job and to selectively choose the one or more second candidate stages for each query plan that correspond to the second temporal indicator associated with the respective query plan to be one or more respective second checkpoints of the recurrent database job.

In a fourth aspect of the example method, the example method further comprises categorizing the stages of the query plans among a plurality of stage types based on the stages of each stage type being configured to perform a respective common subset of operations. In accordance with the fourth aspect, predicting the plurality of values of the plurality of respective attributes of each stage in at least the first subset of the plurality of stages of each query plan indicated by the first temporal indicator associated with the respective query plan comprises predicting the plurality of values of the plurality of respective attributes of each stage in at least the first subset of the plurality of stages of each query plan indicated by the first temporal indicator associated with the respective query plan using a plurality of machine learning techniques on the stages that are categorized among the plurality of respective stage types. The fourth aspect of the example method may be implemented in combination with the first, second, and/or third aspect of the example method, though the example embodiments are not limited in this respect.

An example computer program product comprises a computer-readable storage medium having instructions recorded thereon for enabling a processor-based system to select checkpoints of a recurrent database job by performing operations. The operations comprise determining, at compile time of database queries that define the recurrent database job, temporal indicators associated with query plans that result from compilation of the respective database queries such that one or more temporal indicators are associated with each query plan. Each of the one or more temporal indicators associated with each query plan indicates a first subset of a plurality of stages of the respective query plan that are to have executed by a respective reference time indicated by the respective temporal indicator and a second subset of the plurality of stages of the respective query plan that are not to have executed by the respective reference time. Each stage includes a plurality of threads. The operations further comprise predicting a plurality of values of a plurality of respective attributes of each stage in at least the first subset of the plurality of stages of each query plan indicated by a first temporal indicator associated with the respective query plan by analyzing a plurality of historical values of the plurality of attributes of the respective stage for each of a plurality of historical executions of the respective stage using a machine learning technique. The operations further comprise identifying, at the compile time of the database queries, one or more candidate stages for each query plan from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan. The operations further comprise selectively choosing the one or more candidate stages for each query plan that correspond to the first temporal indicator associated with the respective query plan to be one or more respective checkpoints of the recurrent database job based on whether the plurality of values of the plurality of respective attributes of each stage in at least the first subset of the plurality of stages of the respective query plan indicated by the first temporal indicator associated with the respective query plan satisfy one or more criteria.

In a first aspect of the example computer program product, the operations comprise predicting an output size of an output file of each stage in at least the first subset of the plurality of stages of each query plan indicated by the first temporal indicator associated with the respective query plan based on features correlated to the respective output size. In accordance with the first aspect, the operations comprise predicting a time-to-live of each stage in at least the first subset of the plurality of stages of each query plan indicated by the first temporal indicator associated with the respective query plan based on features correlated to the respective time-to-live. In further accordance with the first aspect, the operations comprise selectively choosing the one or more candidate stages for each query plan that correspond to the first temporal indicator associated with the respective query plan to be one or more respective checkpoints of the recurrent database job based on whether a combination of one or more output sizes of one or more respective output files of the one or more respective candidate stages of the respective query plan that correspond to the first temporal indicator associated with the respective query plan and one or more times-to-live of the one or more respective candidate stages of the respective query plan that correspond to the first temporal indicator associated with the respective query plan satisfies the one or more criteria.

In a second aspect of the example computer program product, the operations comprise predicting a probability that a stage in the second subset of the plurality of stages of each query plan indicated by the first temporal indicator associated with the respective query plan is to fail based on a number of threads in the respective stage, a historic probability of each thread in the respective stage to fail, and a proportion of the stages in the respective query plan in each of the first subset and the second subset of the respective stages. In accordance with the second aspect, the operations comprise predicting an amount of time to be saved during a recovery of the recurrent database job as a result of choosing the one or more candidate stages for each query plan that correspond to the first temporal indicator associated with the respective query plan to be one or more respective checkpoints of the recurrent database job. In further accordance with the second aspect, the operations comprise selectively choosing the one or more candidate stages for each query plan that correspond to the first temporal indicator associated with the respective query plan to be one or more respective checkpoints of the recurrent database job based on whether a combination of the probability that a stage in the second subset of the plurality of stages of the respective query plan indicated by the first temporal indicator associated with the respective query plan is to fail and the amount of time to be saved during the recovery of the recurrent database job as a result of choosing the one or more candidate stages to be one or more respective checkpoints of the recurrent database job satisfies the one or more criteria

IV. Example Computer System

Figure 19:
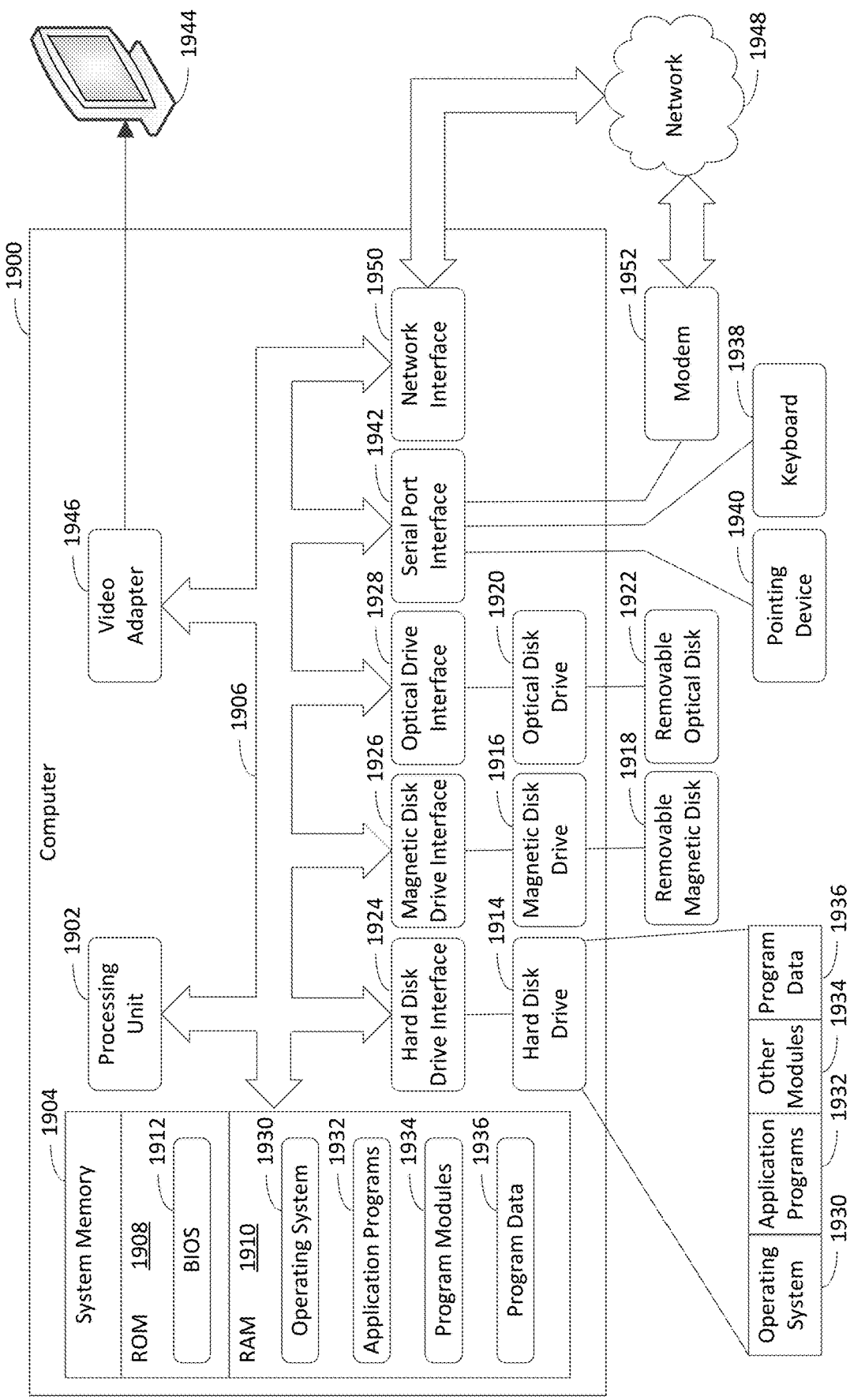
FIG. 19 depicts an example computer in which embodiments may be implemented.

FIG. 19 depicts an example computer 1900 in which embodiments may be implemented. Any one or more of the user devices 102A-102M and/or any one or more of the servers 106A-106N shown in FIG. 1 and/or the fault-tolerance system 600 shown in FIG. 6 may be implemented using computer 1900, including one or more features of computer 1900 and/or alternative features. Computer 1900 may be a general-purpose computing device in the form of a conventional personal computer, a mobile computer, or a workstation, for example, or computer 1900 may be a special purpose computing device. The description of computer 1900 provided herein is provided for purposes of illustration, and is not intended to be limiting. Embodiments may be implemented in further types of computer systems, as would be known to persons skilled in the relevant art(s).

As shown in FIG. 19, computer 1900 includes a processing unit 1902, a system memory 1904, and a bus 1906 that couples various system components including system memory 1904 to processing unit 1902. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computer 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1930, one or more application programs 1932, other program modules 1934, and program data 1936. Application programs 1932 or program modules 1934 may include, for example, computer program logic for implementing any one or more of the data-driven checkpoint selector 112, the data-driven checkpoint selector 412, the compiler 422, the temporal logic 424, the prediction logic 426, the candidate identifier 428, the checkpoint logic 430, the storage logic 432, the stage execution time predictor 606, the stage output size predictor 608, the TTL estimator 610, the checkpoint optimizer 612, the job runtime simulator 614, the time-to-live predictor 616, the workload insights service 618, the query compiler 620, the query optimizer 622, the job scheduler 624, the job manager 626, the ML logic 628, flowchart 200 (including any step of flowchart 200), and/or flowchart 300 (including any step of flowchart 300), as described herein.

A user may enter commands and information into the computer 1900 through input devices such as keyboard 1938 and pointing device 1940. Other input devices (not shown) may include a microphone, joystick, game pad, satellite dish, scanner, touch screen, camera, accelerometer, gyroscope, or the like. These and other input devices are often connected to the processing unit 1902 through a serial port interface 1942 that is coupled to bus 1906, but may be connected by other interfaces, such as a parallel port, game port, or a universal serial bus (USB).

A display device 1944 (e.g., a monitor) is also connected to bus 1906 via an interface, such as a video adapter 1946. In addition to display device 1944, computer 1900 may include other peripheral output devices (not shown) such as speakers and printers.

Computer 1900 is connected to a network 1948 (e.g., the Internet) through a network interface or adapter 1950, a modem 1952, or other means for establishing communications over the network. Modem 1952, which may be internal or external, is connected to bus 1906 via serial port interface 1942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1932 and other program modules 1934) may be stored on the hard disk, magnetic disk, optical disk, ROM, or RAM. Such computer programs may also be received via network interface 1950 or serial port interface 1942. Such computer programs, when executed or loaded by an application, enable computer 1900 to implement features of embodiments discussed herein. Accordingly, such computer programs represent controllers of the computer 1900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to select checkpoints of a recurrent database job, the system comprising:
  memory; and
  one or more processors coupled to the memory, the one or more processors configured to:
    determine, at compile time of database queries that define the recurrent database job, temporal indicators associated with query plans that result from compilation of the respective database queries such that one or more temporal indicators are associated with each query plan, each of the one or more temporal indicators associated with each query plan indicating a first subset of a plurality of stages of the respective query plan that are to have executed by a respective reference time indicated by the respective temporal indicator and a second subset of the plurality of stages of the respective query plan that are not to have executed by the respective reference time, each stage including a plurality of threads;
    predict a plurality of values of a plurality of respective attributes of each stage in at least the first subset of the plurality of stages of each query plan indicated by a first temporal indicator associated with the respective query plan by analyzing a plurality of historical values of the plurality of attributes of the respective stage for each of a plurality of historical executions of the respective stage using a machine learning technique;
    identify, at the compile time of the database queries, one or more candidate stages for each query plan from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan; and
    selectively choose the one or more candidate stages for each query plan that correspond to the first temporal indicator associated with the respective query plan to be one or more respective checkpoints of the recurrent database job based on whether the plurality of values of the plurality of respective attributes of each stage in at least the first subset of the plurality of stages of the respective query plan indicated by the first temporal indicator associated with the respective query plan satisfy one or more criteria.

2. The system of claim 1, wherein the one or more processors are configured to:
  predict an output size of an output file of each stage in at least the first subset of the plurality of stages of each query plan indicated by the first temporal indicator associated with the respective query plan based on features correlated to the respective output size;
  predict a time-to-live of each stage in at least the first subset of the plurality of stages of each query plan indicated by the first temporal indicator associated with the respective query plan based on features correlated to the respective time-to-live; and
  selectively choose the one or more candidate stages for each query plan that correspond to the first temporal indicator associated with the respective query plan to be one or more respective checkpoints of the recurrent database job based on whether a combination of one or more output sizes of one or more respective output files of the one or more respective candidate stages of the respective query plan that correspond to the first temporal indicator associated with the respective query plan and one or more times-to-live of the one or more respective candidate stages of the respective query plan that correspond to the first temporal indicator associated with the respective query plan satisfies the one or more criteria.

3. The system of claim 2, wherein the one or more processors are configured to:
  selectively choose the one or more candidate stages for a designated query plan that correspond to the first temporal indicator associated with the respective query plan to be one or more respective designated checkpoints of the recurrent database job by weighing (A) a benefit of deleting an intermediate output file of each stage in the first subset of the plurality of stages of the designated query plan indicated by the first temporal indicator associated with the respective query plan from a local store of a database against which the recurrent database job is executed against (B) a cost of storing an intermediate output file of each designated checkpoint in a global data store of the database.

4. The system of claim 2, wherein the one or more processors are configured to:
  choose the one or more candidate stages for a designated query plan that correspond to the first temporal indicator associated with the respective query plan to be one or more respective designated checkpoints of the recurrent database job;
  store an intermediate output file of each designated checkpoint in a global data store of a database against which the recurrent database job is executed; and
  delete an intermediate output file of each stage in the first subset of the plurality of stages of the designated query plan indicated by the first temporal indicator associated with the respective query plan from a local store of the database.

5. The system of claim 2, wherein the one or more processors are configured to:
  predict each of one or more times-to-live of the one or more respective candidate stages for each query plan that correspond to the first temporal indicator associated with the respective query plan based on a factor that is equal to a difference between an estimate of a total processing time of the recurrent database job and a temporally last end time of one or more end times of the one or more candidate stages for the respective query plan that correspond to the first temporal indicator associated with the respective query plan.

6. The system of claim 5, wherein the one or more processors are configured to:
predict a start time of each stage in a dependency chain of each candidate stage to be a temporally last end time of child stages of the respective stage.

7. The system of claim 5, wherein the one or more processors are configured to:
selectively choose the one or more candidate stages for each query plan that correspond to the first temporal indicator associated with the respective query plan to be one or more respective checkpoints of the recurrent database job based on whether a product of (A) a sum of the one or more output sizes of the one or more respective output files of the one or more respective candidate stages of the respective query plan that correspond to the first temporal indicator associated with the respective query plan and (B) a least time-to-live of the one or more times-to-live of the one or more respective candidate stages of the respective query plan that correspond to the first temporal indicator associated with the respective query plan is greater than or equal to a threshold value.

8. The system of claim 1, wherein each query plan is associated with a plurality of temporal indicators that include a first respective temporal indicator and a second respective temporal indicator; and
wherein the one or more processors are configured to:
predict a second plurality of values of a plurality of respective attributes of each stage in at least the first subset of the plurality of stages of each query plan indicated by the second temporal indicator associated with the respective query plan by analyzing a second plurality of historical values of the plurality of attributes of the respective stage for each of a second plurality of historical executions of the respective stage using the machine learning technique;
identify, at the compile time of the database queries, one or more second candidate stages for each query plan from the first subset of the plurality of stages of the respective query plan indicated by the second temporal indicator associated with the respective query plan based on each candidate stage being a child of one or more stages in the second subset of the plurality of stages of the respective query plan indicated by the second temporal indicator associated with the respective query plan or not being a child of another stage in the respective query plan; and
selectively choose the one or more second candidate stages for each query plan that correspond to the second temporal indicator associated with the respective query plan to be one or more respective second checkpoints of the recurrent database job based on whether the second plurality of values of the plurality of respective attributes of each stage in at least the first subset of the plurality of stages of each query plan indicated by the second temporal indicator associated with the respective query plan satisfy one or more second criteria.

9. The system of claim 8, wherein the one or more processors are configured to:
use integer programming to selectively choose the one or more candidate stages for each query plan that correspond to the first temporal indicator associated with the respective query plan to be one or more respective checkpoints of the recurrent database job and to selectively choose the one or more second candidate stages for each query plan that correspond to the second temporal indicator associated with the respective query plan to be one or more respective second checkpoints of the recurrent database job.

10. The system of claim 1, wherein the one or more processors are configured to:
categorize the stages of the query plans among a plurality of stage types based on the stages of each stage type being configured to perform a respective common subset of operations; and
predict the plurality of values of the plurality of respective attributes of each stage in at least the first subset of the plurality of stages of each query plan indicated by the first temporal indicator associated with the respective query plan using a plurality of machine learning techniques on the stages that are categorized among the plurality of respective stage types.

11. A method of selecting checkpoints of a recurrent database job, the method comprising:
determining, at compile time of database queries that define the recurrent database job, temporal indicators associated with query plans that result from compilation of the respective database queries such that one or more temporal indicators are associated with each query plan, each of the one or more temporal indicators associated with each query plan indicating a first subset of a plurality of stages of the respective query plan that are to have executed by a respective reference time indicated by the respective temporal indicator and a second subset of the plurality of stages of the respective query plan that are not to have executed by the respective reference time, each stage including a plurality of threads;
predicting a plurality of values of a plurality of respective attributes of each stage in at least the first subset of the plurality of stages of each query plan indicated by a first temporal indicator associated with the respective query plan by analyzing a plurality of historical values of the plurality of attributes of the respective stage for each of a plurality of historical executions of the respective stage using a machine learning technique;
identifying, at the compile time of the database queries, one or more candidate stages for each query plan from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan; and
selectively choosing the one or more candidate stages for each query plan that correspond to the first temporal indicator associated with the respective query plan to be one or more respective checkpoints of the recurrent database job based on whether the plurality of values of the plurality of respective attributes of each stage in at least the first subset of the plurality of stages of the respective query plan indicated by the first temporal indicator associated with the respective query plan satisfy one or more criteria.

12. The method of claim 11, wherein predicting the plurality of values of the plurality of respective attributes of each stage in at least the first subset of the plurality of stages of each query plan indicated by the first temporal indicator associated with the respective query plan comprises:
  predicting a probability that a stage in the second subset of the plurality of stages of each query plan indicated by the first temporal indicator associated with the respective query plan is to fail based on a number of threads in the respective stage, a historic probability of each thread in the respective stage to fail, and a proportion of the stages in the respective query plan in each of the first subset and the second subset of the respective stages; and
  predicting an amount of time to be saved during a recovery of the recurrent database job as a result of choosing the one or more candidate stages for each query plan that correspond to the first temporal indicator associated with the respective query plan to be one or more respective checkpoints of the recurrent database job; and
  wherein selectively choosing the one or more candidate stages for each query plan that correspond to the first temporal indicator associated with the respective query plan to be one or more respective checkpoints of the recurrent database job comprises:
    selectively choosing the one or more candidate stages for each query plan that correspond to the first temporal indicator associated with the respective query plan to be one or more respective checkpoints of the recurrent database job based on whether a combination of the probability that a stage in the second subset of the plurality of stages of the respective query plan indicated by the first temporal indicator associated with the respective query plan is to fail and the amount of time to be saved during the recovery of the recurrent database job as a result of choosing the one or more candidate stages to be one or more respective checkpoints of the recurrent database job satisfies the one or more criteria.

13. The method of claim 12, wherein selectively choosing the one or more candidate stages for each query plan that correspond to the first temporal indicator associated with the respective query plan to be one or more respective checkpoints of the recurrent database job comprises:
  selectively choosing the one or more candidate stages for a designated query plan that correspond to the first temporal indicator associated with the respective query plan to be one or more respective designated checkpoints of the recurrent database job by weighing (A) a benefit of increasing the amount of time to be saved during a recovery of the recurrent database job based on a product of (1) the probability that a stage in the second subset of the plurality of stages of the respective query plan indicted by the first temporal indicator associated with the respective query plan is to fail and (2) the amount of time to be saved during the recovery of the recurrent database job as a result of choosing the one or more candidate stages to be one or more respective checkpoints of the recurrent database job against (B) a cost of storing an intermediate output file of each designated checkpoint in a global data store of the database.

14. The method of claim 12, wherein predicting the amount of time to be saved during a recovery of the recurrent database job as a result of choosing the one or more candidate stages for each query plan that correspond to the first temporal indicator associated with the respective query plan to be one or more respective checkpoints of the recurrent database job comprises:
  predicting the amount of time to be saved during a recovery of the recurrent database job as a result of choosing the one or more candidate stages for a designated query plan that correspond to the first temporal indicator associated with the respective query plan to be one or more respective designated checkpoints of the recurrent database job to be equal to an amount of time from a start of the recurrent database job until a temporally last starting time of one or more starting times of the one or more respective candidate stages of the designated query plan.

15. The method of claim 14, wherein predicting the amount of time to be saved during a recovery of the recurrent database job as a result of choosing the one or more candidate stages for the designated query plan that correspond to the first temporal indicator associated with the respective query plan comprises:
  predicting a start time of each stage in a dependency chain of each candidate stage of the designated query plan to be same as a temporally last end time of child stages of the respective stage.

16. The method of claim 12, wherein selectively choosing the one or more candidate stages for each query plan that correspond to the first temporal indicator associated with the respective query plan to be one or more respective checkpoints of the recurrent database job comprises:
  selectively choosing the one or more candidate stages for each query plan that correspond to the first temporal indicator associated with the respective query plan to be one or more respective checkpoints of the recurrent database job based on whether a product of (1) a probability that a stage in the first subset of the plurality of stages of the respective query plan indicted by the first temporal indicator associated with the respective query plan is to succeed, (2) the probability that a stage in the second subset of the plurality of stages of the respective query plan indicated by the first temporal indicator associated with the respective query plan is to fail, and (3) the amount of time to be saved during the recovery of the recurrent database job as a result of choosing the one or more candidate stages to be one or more respective checkpoints of the recurrent database job is greater than or equal to a threshold value.

17. The method of claim 11, wherein each query plan is associated with a plurality of temporal indicators that include a first respective temporal indicator and a second respective temporal indicator; and
  wherein the method comprises:
    predicting a second plurality of values of a plurality of respective attributes of each stage in at least the first subset of the plurality of stages of each query plan indicated by the second temporal indicator associated with the respective query plan by analyzing a second plurality of historical values of the plurality of attributes of the respective stage for each of a second plurality of historical executions of the respective stage using the machine learning technique;
    identifying, at the compile time of the database queries, one or more second candidate stages for each query plan from the first subset of the plurality of stages of the respective query plan indicated by the second temporal indicator associated with the respective query plan based on each candidate stage being a child of one or more stages in the second subset of the plurality of stages of the respective query plan indicated by the second temporal indicator associated with the respective query plan or not being a child of another stage in the respective query plan; and selectively choosing the one or more second candidate stages for each query plan that correspond to the second temporal indicator associated with the respective query plan to be one or more respective second checkpoints of the recurrent database job based on whether the second plurality of values of the plurality of respective attributes of each stage in at least the first subset of the plurality of stages of each query plan indicated by the second temporal indicator associated with the respective query plan satisfy one or more second criteria.

18. A computer program product comprising a computer-readable storage medium having instructions recorded thereon for enabling a processor-based system to select checkpoints of a recurrent database job by performing operations, the operations comprising:

determine, at compile time of database queries that define the recurrent database job, temporal indicators associated with query plans that result from compilation of the respective database queries such that one or more temporal indicators are associated with each query plan, each of the one or more temporal indicators associated with each query plan indicating a first subset of a plurality of stages of the respective query plan that are to have executed by a respective reference time indicated by the respective temporal indicator and a second subset of the plurality of stages of the respective query plan that are not to have executed by the respective reference time, each stage including a plurality of threads;

predict a plurality of values of a plurality of respective attributes of each stage in at least the first subset of the plurality of stages of each query plan indicated by a first temporal indicator associated with the respective query plan by analyzing a plurality of historical values of the plurality of attributes of the respective stage for each of a plurality of historical executions of the respective stage using a machine learning technique;

identify, at the compile time of the database queries, one or more candidate stages for each query plan from the first subset of the plurality of stages of the respective query plan indicated by the first temporal indicator associated with the respective query plan based on each candidate stage being a child of one or more stages in the second subset of the plurality of stages of the respective query plan indicated by the first temporal indicator associated with the respective query plan or not being a child of another stage in the respective query plan; and selectively choose the one or more candidate stages for each query plan that correspond to the first temporal indicator associated with the respective query plan to be one or more respective checkpoints of the recurrent database job based on whether the plurality of values of the plurality of respective attributes of each stage in at least the first subset of the plurality of stages of the respective query plan indicated by the first temporal indicator associated with the respective query plan satisfy one or more criteria.

19. The computer program product of claim 18, wherein the operations comprise:

predict an output size of an output file of each stage in at least the first subset of the plurality of stages of each query plan indicated by the first temporal indicator associated with the respective query plan based on features correlated to the respective output size;

predict a time-to-live of each stage in at least the first subset of the plurality of stages of each query plan indicated by the first temporal indicator associated with the respective query plan based on features correlated to the respective time-to-live; and selectively choose the one or more candidate stages for each query plan that correspond to the first temporal indicator associated with the respective query plan to be one or more respective checkpoints of the recurrent database job based on whether a combination of one or more output sizes of one or more respective output files of the one or more respective candidate stages of the respective query plan that correspond to the first temporal indicator associated with the respective query plan and one or more times-to-live of the one or more respective candidate stages of the respective query plan that correspond to the first temporal indicator associated with the respective query plan satisfies the one or more criteria.

20. The computer program product of claim 18, wherein the operations comprise:

predict a probability that a stage in the second subset of the plurality of stages of each query plan indicated by the first temporal indicator associated with the respective query plan is to fail based on a number of threads in the respective stage, a historic probability of each thread in the respective stage to fail, and a proportion of the stages in the respective query plan in each of the first subset and the second subset of the respective stages;

predict an amount of time to be saved during a recovery of the recurrent database job as a result of choosing the one or more candidate stages for each query plan that correspond to the first temporal indicator associated with the respective query plan to be one or more respective checkpoints of the recurrent database job; and selectively choose the one or more candidate stages for each query plan that correspond to the first temporal indicator associated with the respective query plan to be one or more respective checkpoints of the recurrent database job based on whether a combination of the probability that a stage in the second subset of the plurality of stages of the respective query plan indicated by the first temporal indicator associated with the respective query plan is to fail and the amount of time to be saved during the recovery of the recurrent database job as a result of choosing the one or more candidate stages to be one or more respective checkpoints of the recurrent database job satisfies the one or more criteria.

* * * * *